(12) United States Patent
Delabbio

(10) Patent No.: US 9,516,865 B2
(45) Date of Patent: Dec. 13, 2016

(54) METHOD AND SYSTEM FOR ENHANCING GROWTH AND SURVIVABILITY OF AQUATIC ORGANISMS

(71) Applicant: Juliette Delabbio, Natchitoches, LA (US)

(72) Inventor: Juliette Delabbio, Natchitoches, LA (US)

(73) Assignee: Juliette Delabbio, Natchitoches, LA (US)

( * ) Notice: Subject to any disclaimer, the term of this patent is extended or adjusted under 35 U.S.C. 154(b) by 0 days.

(21) Appl. No.: 15/064,620

(22) Filed: Mar. 9, 2016

(65) Prior Publication Data

US 2016/0183500 A1   Jun. 30, 2016

Related U.S. Application Data

(63) Continuation of application No. 14/631,467, filed on Feb. 25, 2015, now Pat. No. 9,345,235, which is a continuation of application No. 13/722,263, filed on Dec. 20, 2012, now Pat. No. 9,016,240.

(60) Provisional application No. 61/578,559, filed on Dec. 21, 2011.

(51) Int. Cl.
```
A01K 31/00     (2006.01)
A01K 61/00     (2006.01)
A01K 63/06     (2006.01)
```
(52) U.S. Cl.
CPC ............ *A01K 61/005* (2013.01); *A01K 61/00* (2013.01); *A01K 63/06* (2013.01)

(58) Field of Classification Search
CPC ...... A01K 63/06; A01K 61/005; A01K 61/00; A01K 61/002; A01K 61/008; A01K 63/00

USPC ............... 119/200, 213, 267, 204, 216, 218, 215,119/236
See application file for complete search history.

(56) References Cited

U.S. PATENT DOCUMENTS

| | | | | |
|---|---|---|---|---|
| 2,709,984 A * | 6/1955 | Marks | ..................... | A01K 79/02 119/220 |
| 3,563,204 A * | 2/1971 | Szilagyi | ................. | A01K 63/06 119/267 |
| 3,828,176 A * | 8/1974 | Goldman | ............... | A01K 63/06 119/267 |
| 3,951,104 A * | 4/1976 | Neff | ....................... | A01K 61/02 119/216 |
| 4,253,418 A * | 3/1981 | Lockwood | ........... | A01K 61/002 119/236 |
| 4,379,437 A * | 4/1983 | Knowles | .............. | A01K 61/007 119/230 |

(Continued)

FOREIGN PATENT DOCUMENTS

CN         101868529         10/2010

OTHER PUBLICATIONS

"Fish Culture in Light Net Pen Underwater", Hongshan SU Journal of Zoology, vol. 2, 1983, pp. 31-32.

(Continued)

*Primary Examiner* — Yvonne Abbott-Lewis
(74) *Attorney, Agent, or Firm* — Andre Roland; Nikolaus Schibli

(57) ABSTRACT

A method for enhancing the production of aquatic organisms under cultivation, including the steps of exposing the aquatic organisms to a submerged illumination source inside water of a rearing unit; and maintaining illumination in the rearing unit for a rearing period.

17 Claims, 17 Drawing Sheets

(56) References Cited

U.S. PATENT DOCUMENTS

| | | | | |
|---|---|---|---|---|
| 4,475,480 | A | * | 10/1984 | Bodker, Jr. .......... A01K 61/005 119/213 |
| 4,554,759 | A | * | 11/1985 | Edling .................. A01K 69/08 119/213 |
| 4,726,321 | A | * | 2/1988 | Malone ................ A01K 61/005 119/213 |
| 5,027,550 | A | * | 7/1991 | Mori ...................... A01G 7/045 119/200 |
| 5,211,469 | A | * | 5/1993 | Matthias ................ A01K 63/06 362/101 |
| 5,713,303 | A | * | 2/1998 | Willinsky ............ A01K 61/008 119/218 |
| 6,203,170 | B1 | * | 3/2001 | Patrick .................. A01K 79/02 362/158 |
| 6,347,908 | B1 | * | 2/2002 | Safwat .................... E02B 8/085 119/219 |
| 6,564,747 | B2 | * | 5/2003 | Harris, Jr. .............. A23K 50/80 119/230 |
| 7,000,567 | B1 | * | 2/2006 | Hsiao .................. A01K 61/006 119/204 |
| 7,069,876 | B2 | | 7/2006 | Harris et al. |
| 7,220,018 | B2 | * | 5/2007 | Crabb .................... A01G 7/045 362/231 |
| 7,500,776 | B1 | * | 3/2009 | Buczko .................. A01K 63/06 119/267 |
| 2001/0045189 | A1 | * | 11/2001 | McNeil ................ A01K 61/005 119/204 |
| 2004/0211367 | A1 | * | 10/2004 | Jablonsky .............. A01K 61/00 119/201 |
| 2013/0152864 | A1 | * | 6/2013 | Grajcar .................. F21V 29/58 119/204 |
| 2013/0153938 | A1 | | 6/2013 | Grajcar |
| 2013/0157394 | A1 | | 6/2013 | Grajcar |

OTHER PUBLICATIONS

Charles "Sandy" Harris, "Bio-floc shrimp system yields high density production, low FCR's and superior survival rates using bottom diffused aeration and patented probiotics," Fish Farming News, Iss. 1, 2011, pp. 22-27.

Cronin et al., "Spectral Sensitivity in Crustacean Eyes," The Crustacean Nervous System, Konrad Weise (Ed.), Springer Verlag Berlin, Heidelberg, 2002, p. 499-511.

Edward A. Trippel, "Pathway of effects of artificial light on non-target organisms at aquaculture sites in Canada," Canadian Science Advisory Secretariat (CSAS), Research Document 2010/023, 19 pages.

English translation of Office Action from Chinese Patent Office—Application No. 2012800701246.

Goldsmith et al., "Comparative Studies of Crustacean Spectral Sensitivity," Zeitschrift für vergleichende Physiologie 60, 1968, pp. 156-175.

Gonzalez et al., "Shelter and lighting in the intensive rearing of juvenile crayfish (Pacifastacus Leniusculus, Astacidae) from the onset of exogenous feeding," Aquaculture Research, 2011, vol. 42, pp. 450-456.

Janet McConnaughey, "Researcher Uses Light to Grow Bigger Crawfish," Huffington Post Article, http://www.huffingtonpost.com/2011/07/06/bigger-crawfish-ligh_n_ 891168.html, Jul. 6, 2011.

Kui You et al., "Effects of different light sources and illumination methods on growth and body color of shrimp *Litopenaeus vannamei*," Aquaculture, vol. 252, 2006, pp. 557-565.

Morgan et al., "Sources of stress in captivity," Science Direct, Applied Animal Behaviour Science, vol. 102, pp. 262-302, 2007.

Office Action from the Chinese Patent Office (State Intellectual Property Office "SIPO")—1st Office Action—Application No. 201280070124.6 (counterpart application).

Office Action from the Chinese Patent Office (State Intellectual Property Office "SIPO")—2nd Office Action, Application No. 201280070124.6 (counterpart application) with English Translation, Jan. 18, 2016.

U.S. Appl. No. 61/570,552, filed Dec. 14, 2011, inventor Zdenko Grajcar.

Robert P. Romaire et al., "Crawfish Production: Harvesting," SRAC Publication No. 2400, Southern Regional Aquaculture Center, May 2004, 6 pages.

Saez-Royuela et al., "Modified Photoperiod and Light Intensity Influence on Survival and Growth of Stage 2 Juvenile Signal Crayfish *Pacifastacus Leniusculus*," Journal of Applied Aquaculture, vol. 6:3, pp. 33-37, 1996.

Wang et al., "The effect of light color on the growth of Chinese shrimp *Fenneropenaeus chinensis*,"Aquaculture, vol. 228, Dec. 2003, pp. 351-360.

\* cited by examiner

METHOD AND SYSTEM FOR ENHANCING GROWTH AND SURVIVABILITY OF AQUATIC ORGANISMS

CROSS-REFERENCE TO RELATED APPLICATIONS

The present application is a Continuation Application of U.S. application Ser. No. 14/631,467, filed Feb. 25, 2015, which in turn is a Continuation Application of U.S. application Ser. No. 13/722,263, filed Dec. 20, 2012, now U.S. Pat. No. 9,016,240, the entire contents of which are incorporated herein by reference. The benefit of the Dec. 21, 2011 filing of the U.S. provisional patent application Ser. No. 61/578,559 is claimed under 35 U.S.C. §119(e) in the United States, and is claimed under applicable treaties and conventions in all countries.

TECHNICAL FIELD

This invention pertains to a method and a system for enhancing the size and quantity of aquatic organisms during rearing, for example crayfish, by manipulating environmental lighting using submerged artificial illumination.

BACKGROUND ART

The use of illumination to manipulate the environmental light of a variety of animals has been reported. In particular, manipulating an organism's environment by altering its natural exposure to light has been practiced for land animals to affect desirable changes in those animals. Typically changes of the natural photoperiod for land animals have involved placing sources of illumination such as electrical lights in the organisms rearing environment, for example for rearing chicken in closed farm houses.

For commercial shrimp production, it has been reported that superior survival rates have been produced for high density production by using bottom diffused aeration. In the publication entitled "Bio-floc shrimp system yields high density production, low FCR's and superior survival rates using bottom diffused aeration and patented probiotics," Charles "Sandy" Harris, Fish Farming News, pages 22-27, Issue 1, 2011, air-diffusing tubing has been installed on the bottom of artificial shrimp production ponds, and combined with other factors related to the operation of the shrimp production ponds, production yields could be increased.

Artificial light manipulation for rearing Crustaceans has typically involved using above-water illumination. As discussed in the publication entitled "Effects of different light sources and illumination methods on growth and body color of shrimp," Kui You et al., Aquaculture, volume 252, pages 557-565, 2006, different light sources of above-water illumination have been tested to examine the growth of shrimp during a 50-day experimental period, by using relatively small aquaria and having lighting installed about 60 cm to 80 cm above the aquaria. Similarly, in the publication that is entitled "The effect of light color on the growth of Chinese shrimp *Fenneropenaeus chinensis*," Wang et al., Aquaculture, volume 228 (1), pages 351-360, December 2003, it was proposed to use artificial illumination that was located above the water.

Despite all the above described advancements in the fields of rearing aquatic organisms, there is still a strong need for methods and systems for enhancing growth and survivability of these organisms.

SUMMARY OF THE EMBODIMENTS OF THE INVENTION

According to a first aspect of the present invention, a method for enhancing the production of aquatic organisms under cultivation is provided. The method preferably includes the steps of exposing the aquatic organisms to a submerged illumination source inside water of a rearing unit, and maintaining illumination in the rearing unit for a rearing period.

According to another aspect of the present invention, a method for affecting the growth of aquatic organisms is provided. Preferably, the method includes the steps of exposing the aquatic organisms under cultivation to a plurality of submerged illumination sources within an aquatic rearing unit; and maintaining illumination in the rearing unit for a rearing period.

Moreover, according to yet another aspect of the present invention, a system for enhancing the production of aquatic organisms under cultivation is provided. The system preferably includes a rearing unit configured to contain water and the aquatic organisms, a plurality of illumination sources configured to be arranged below an upper surface of the water in the rearing unit, and a control device configured to operate the plurality of illumination sources to maintain illumination inside the rearing unit under the upper surface of the water for a rearing period.

These and other aspects of the present invention will become more evident upon reference to the following detailed description and attached drawings. It is to be understood, however, that various changes, alterations, and substitutions may be made to the specific embodiments disclosed herein without departing from their essential spirit and scope.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

Herein, identical reference numerals are used, where possible, to designate identical elements that are common to the figures. Also, the images in the drawings are simplified for illustration purposes and may not be depicted to scale.

DETAILED DESCRIPTION OF THE EMBODIMENTS OF THE INVENTION

Figure 1:
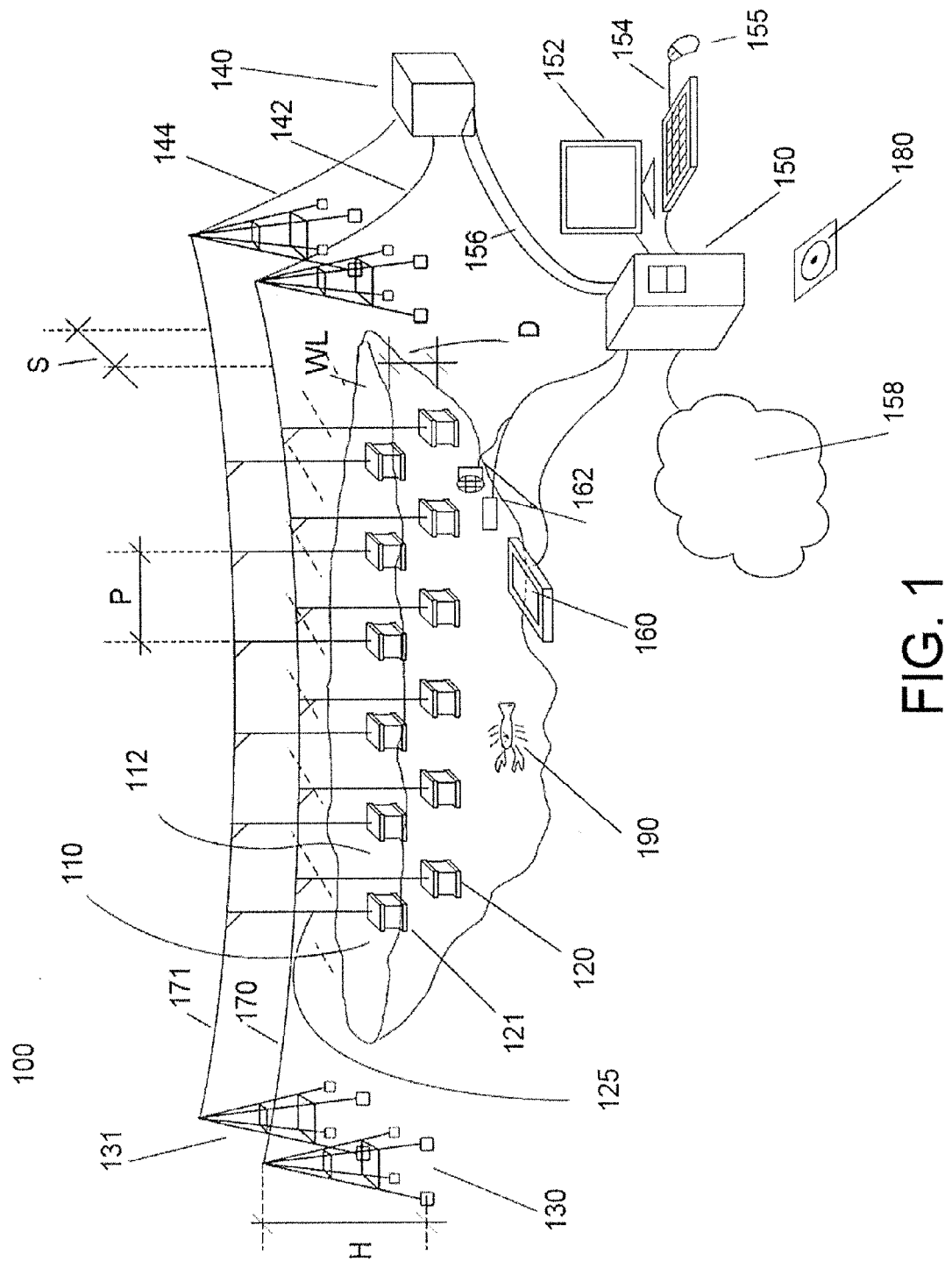
FIG. 1 shows a top perspective view of the aquatic illumination system according to a first embodiment of the present invention.

FIG. 1 shows an overview of the aquatic illumination system 100 according to a first embodiment. System 100 includes a holding unit or rearing unit 110, for example but not limited to ponds, lakes, pens, tanks, basins, pools, tubs, aquariums, portions of a river or ocean that can be sectioned underwater by fences or nets, canals, or any other structure that can contain or enclose water 112, for example fresh water, brackish water, salt water for the purpose or rearing aquatic organisms 190. At each side of the rearing unit 110, two holding structures 130, 131 are arranged, for example masts, poles, or towers that allows to suspend traversing cables 170, 171 that includes power wiring 142, 144 over the rearing unit 110. It is also possible that holding structures are concrete blocks that are arranged on ground, having a height that is only insubstantially above the water level of water 112, and that traversing cables are non-oxidizing steel cables that are strongly tensioned between two corresponding concrete blocks. In the variant shown, there are two traversing cables 170, 171 and power wirings 142, 144, but depending on the size of the surface of the rearing unit 110, many more can be provided, and they can also be arranged in two different directions, preferably perpendicularly to each other to form a grid of cables 170, 171. Two rows of illumination lights 120, 121 are arranged inside the water 112 underneath the water level of rearing unit 110 to provide light illumination inside rearing unit 110.

A key aspect of the present invention is the arrangement of lights 120, 121 such that the emitted light enters into water 112 without reflecting off the water surface, more particularly the air-to-water interface, for example by arranging illumination lights 120, 121 below the water surface. It has been shown that if light emitted by lights 120, 121 passed through upper water surface to enter water 112, many different effects modify the light that actually enters the water, and changes the light originally emitted above the water substantially. For example, a condition of the upper surface of the water 112 is decisive on how the light passes into it. Light coming from an optically less dense medium being air and entering an optically denser medium being water, light is partially reflected back while only partly entering water 112. Depending on the upper surface of water 112, light also becomes diffused and scattered randomly in all directions. The amount of light that is reflected upward depends strongly on the height of arranging illumination lights 120, 121 above water 112, and the condition of water 112, for example a rough water surface with waves can absorb more light as compared to a mirror-like surface, or depending on objects on the surface of water 112. Also, light that enters the water becomes polarized and also partially filtered from different wavelengths, so that color content, thermal content, etc. of the originally emitted light is modified. Therefore, if there is a transition of light though an air-to-water interface into water 112, as done by the background systems, lighting conditions inside the water are highly irregular over time and not constant, are strongly weakened, and have different spectral and polarization characteristics.

A variety of sources of illumination including, but not limited to incandescent bulbs, halogen lighting, phosphorescence, fluorescence, chemi-luminescence, light emitting diodes ("LED"), and liquid crystal devices ("LCD"), can be used for illumination lights 120, 121, as long as they provide desirable illumination characteristics such as but not limited to color, spectrum interval, intensity, duration, and periodicity, and can be packaged in a water-proof casing, preferably meeting IP68 standards. Illumination lights 120, 121 are suspended by a cables 125 for each light 120, 121 that are attached to traversing cables 170, 171. Instead of cables, rods, poles or other attachment means can be used that allow to suspend lights 120, 121 from traversing cables 170, 171. A spacing S between cables 170, 171 and pitch P between adjacent lights 120, 121 are chosen to be substantially constant and having a length such that an area of water 112 inside rearing unit 110 can be illuminated substantially homogenously.

Next, illumination lights 120, 121 can be fed with electrical power for illumination via power wiring 142, 144 that originates from power distribution apparatus 140. Power distribution apparatus 140 can be a simple multiple power outlet strip that has a switch to turn-on and turn-off the lights 120, 121, but can also be a sophisticated electronic power switching device that allows to electronically or mechanically turn-on and turn-off the lights 120, 121 and can also individually control the brightness of the lights 120, 121 by a dimming operation, for example by using an electronically controllable variac or triac. Power distribution apparatus 140 itself is also connected via control bus 156 to controller 150, for example but not limited to a personal computer (PC), MacIntosh, or universal industrial controller having a hardware microprocessor integrated therein. Controller 150 can be connected to display screen 152 that can be used for a user to monitor the method that is executed by system 100 by a graphical user interface, for example but not limited to showing historic switching cycles for the lights 120, 121, times for sunrise and sunset, weather data, progress in the harvesting cycle. Other information that may be displayed and stored includes light spectra at different time periods, battery life, counting of the hours-of-use or detecting biofouling of lights for individual lights for maintenance cycles, troubleshooting information. Moreover, controller 150 can also be connected to keyboard 154 and mouse 155 for user interaction with controller 150, to configure system, for example but not limited to start a harvesting cycle, turn-off entire system, generate reports.

Moreover, controller 150 can also be equipped with an optical disk drive for example a digital video disk (DVD) drive or Blu-Ray™ drive, universal serial bus (USB) plugs, memory card readers, so that a non-transitory computer readable medium 180, for example but not limited to a USB drive, DVD disk, Blu-Ray™ disk, portable hard drive, flash drives can be connected to controller 150. Computer readable medium 180 can have program code or software recorded thereon, having computer instructions that can be executed by controller 150, for example to perform a method of controlling the system 100. However, computer readable medium 180 can also be used to record data that is related to method performed on system 100, for example performance reports of the operation of system 100, historic data on the harvesting cycles for archiving. Moreover, controller 150 can also be connected to the Internet 158 via a network interface, so that the method can also be remotely monitored. In FIG. 1, controller 150 is shown to be located at the site where the rearing unit 110 is located, but it is also possible controller 150 is located at a remote location, and that controller 150 is in communication with power distribution apparatus 140 via the Internet or a cellular phone network, so that both controller 150 and power distribution apparatus 140 are equipped with communication means, for example but not limited to cellular phone modems, Internet or intranet connections, Wifi. Thereby, control bus 156 would be a wireless connection. The Internet connection can be used for controller 150 to access weather data, satellite images, temperature forecasts, or any other data that is available that can be used to control the method for operating system 100.

Also, controller 150 can be connected to sensors for measurement purposes, for example light meter 160 having a photodiode array and temperature probe 162 or other sensors. In the variant shown, temperature probe 162 that measures the water temperature in rearing unit 110 or the ambient air temperature. Light meter 160 can be used to measure the environmental light intensity, to detect sunshine and darkness, dusk and dawn times, overcast situation. Other sensors can also be connected to controller 150, for example but not limited to pH meters to measure acidity or alkalinity of water 112, oxygen sensors and actuators of an aeration system to measure and control oxygen content of water 112, video cameras for surveillance and monitoring, sensors and actuators to operate a feeding mechanism for the aquatic organism (not shown), barometric sensors for weather data, wind sensors to detect storm winds that could damage holding structures 130, 131 and traversing cables 170, 171, water flow measurement sensors to measure flow velocities to control or limit water flow, water level sensors to measure a water level that can fluctuate due to tides, seasonal changes, rain-based changes, evaporation. In a variant, sensors 160, 162 could also be connected to the power distribution apparatus 140 if it is equipped with the necessary controller, so that the data of the sensors 160, 162 can be wirelessly and remotely transmitted to controller 150.

Various dimensions and arrangements of the system 100 are possible. For example, the height H of the traversing cables 170, 171 from the upper surface of water can be from being just above the water or even submersed into the water, to several meters, in the example shown about 6 m. Cables 170, 171 will most likely hang down because they cannot be tensioned too strongly. The distance S between the two rows formed by cables 170, 171, the pitch P between adjacent illumination lights 120, 121, and the illumination power in candela or lumen of illumination lights 120, 121 is chosen such that in complete darkness, a defined area inside the rearing unit 110 is substantially homogenously illuminated at a certain depth. In a typical configuration, adjacent lights 120, 121 have a pitch P of about 1 m to 10 m, and a spacing S in about the same range. The entire growing and rearing area is defined as a space DS, and does not necessarily need to have full illumination, and light intensity, color, spectrum, periodicity and duration, depth of penetration of light into water 112 depends on species that are under culture, rearing unit characteristics, and the desired effect on production and survivability. Depending on the size and dimensions of rearing unit 110, the defined space DS at a certain depth can be the entire inner space of rearing unit 110. Also, system 100 does not necessarily have any devices, structures, and cables along the bottom ground of rearing unit 110 so that the ground of rearing unit 110 could be further equipped with water aeration systems such as diffusion tubing, feeding systems, or are kept unobstructed for passing nets for animal collection and cleaning of rearing unit 110.

Figure 2:
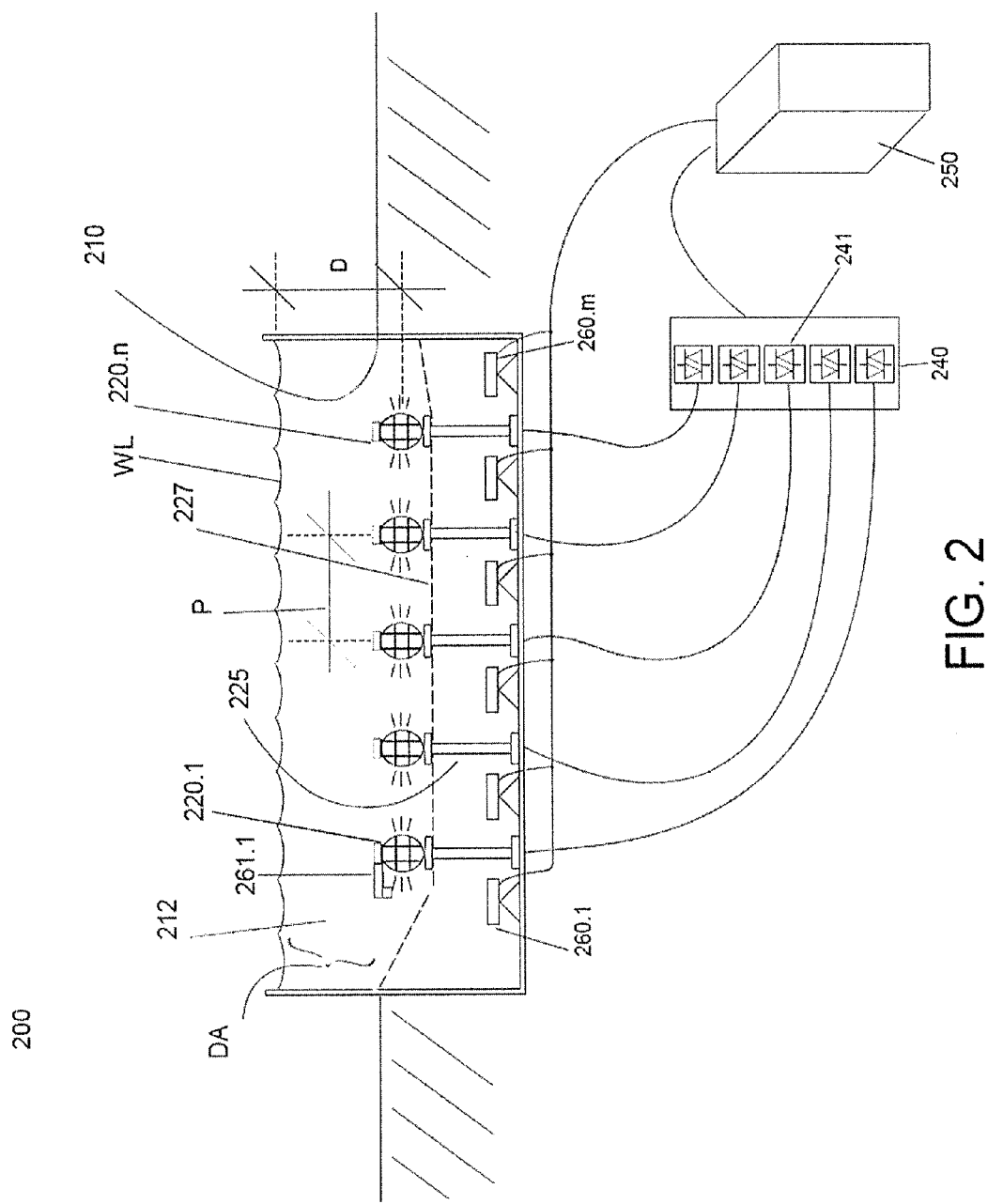
FIG. 2 shows a side cross-sectional view through a rearing unit of the aquatic illumination system according to another embodiment of the present invention.

FIG. 2 shows another embodiment of the aquatic illumination system 200 of the present invention, in which lights 220.1 to 220.*n* are arranged at the same depth D inside a rearing unit 210 in form of a tank that is partially embedded into the ground. Only one row of lights is shown, but this embodiment also encompasses the arrangement of lights in several rows at spacing S, to form a matrix of lights. In this variant, the lights 220.1 to 220.*n* are not hung from cables that lie above the water 212, but are arranged on poles 225 that are attached to the bottom wall of rearing unit 210, spaced out by a substantially equal pitch P. Also, this variant shows the use of multiple photometers 260.1 to 260.*m*, that are arranged in an area between lights 220.1 to 220.*n* also preferably arranged on stands to not be placed in the bottom of rearing unit 210 where dirt, depositions and mud can accumulate. Photometers 260.1 to 260.*m* are submerged into the water and allow to provide local information on the lighting conditions close to adjacent lights. In addition, power distribution apparatus 240 allows to individually control lights 220.1 to 220.*n*, by having an individual power controlling device 241 for each light 220.1 to 220.*n*. Signals that are read from photometers 260.1 to 260.*m* are fed to controller 250, and controller 250 configured to control the individual power controlling devices 241 of power distribution apparatus 240, so that the light intensity of each light 220.1 to 220.*n* can be individually controlled. Instead of having individual power controlling devices 241 at the power distribution apparatus 240, in a variant they can also be arranged directly inside each light 220.1 to 220.*n*.

Because the array of photometers 260.1 to 260.*m* are adjacent to corresponding lights, it is possible to have local knowledge of the illumination conditions inside rearing unit 210 that allows control of the illumination characteristic, for example but not limited to intensity, color, spectrum, of the individual lights 220.1 to 220.*n* to maintain a substantially consistent illumination throughout rearing unit 210. This could be advantageous for large rearing units 210 in which the water turbidity or murkiness is very variable throughout rearing unit 210, and regardless of the inhomogeneous murkiness, constant illumination strength has to be preserved. In a variant, photometers 260.1 to 260.*m* have the same count as the light 220.1 to 220.*n* and are attached to lights 220.1 to 220.*n*, respectively, as exemplified in FIG. 2 with photometer 261.1, so that a lighting condition in proximity of corresponding light 220.1 can be measured. By having such photometers associated with lights 220.1 to 220.*n*, it is also possible to detect faulty lights or non-operative lights for replacement. This could be very advantageous if a large rearing unit 210 with many lights 220.1 to 220.*n* is operated so that the faulty light can be easily identified and replaced. Also the present embodiment shows a substrate or netting 227 that is attached to sidewalls of rearing unit 210 and lights 220.1 to 220.*n*. Aquatic organisms can thereby be limited to be placed in an upper area of rearing unit 210, in defined space DA that can be homogenously illuminated. Such substrates 227 can also be used to define partial spaces of rivers, oceans, and lakes for rearing purposes, to lay out defined space DA, and to keep predators away from the to-be-reared aquatic organisms. In a variant, it is also possible that each of the lights 220.1 to 220.*n* is associated with its own aerator (not shown) and some other water quality sensors that would allow controlling the temperature of water 212, but also for dissolved oxygen management at a local level.

Figure 3:
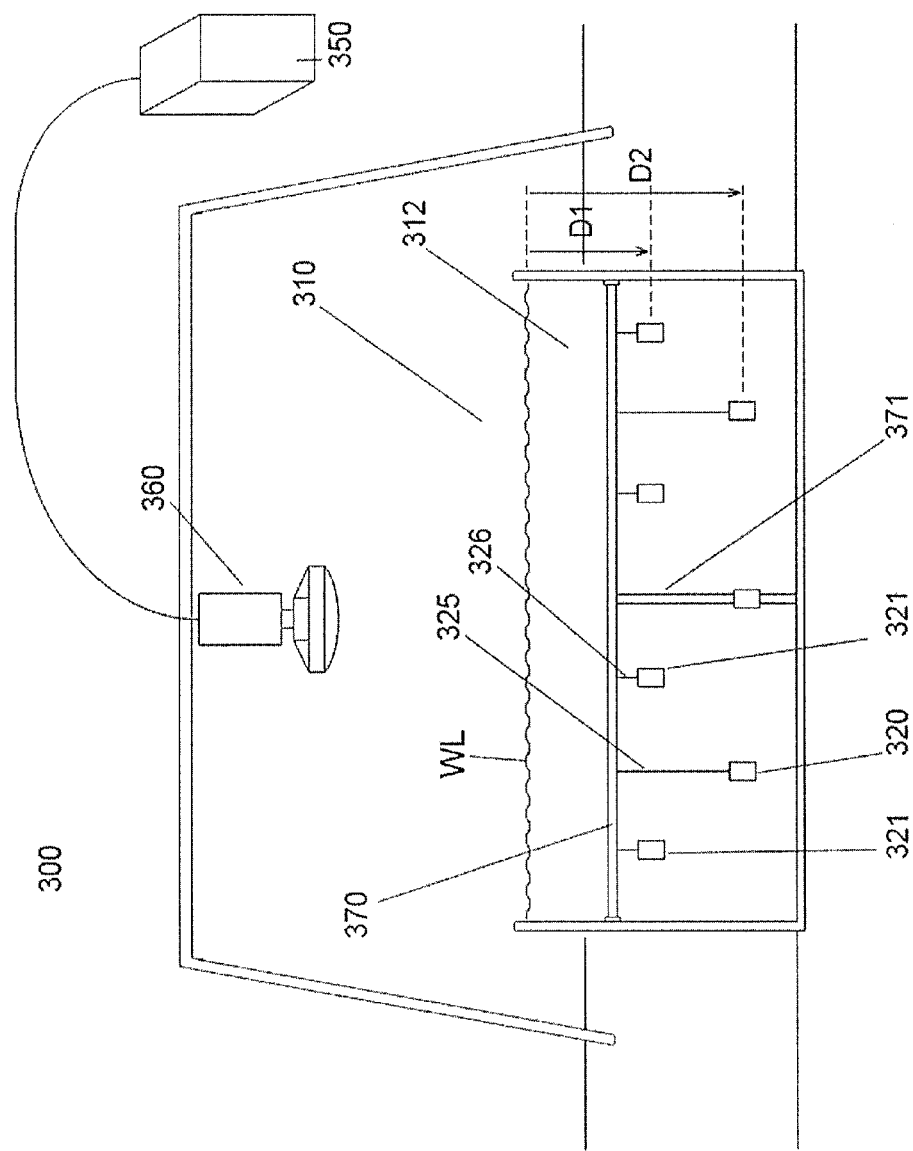
FIG. 3 shows a side cross-sectional view through a rearing unit of the aquatic illumination system according to yet another embodiment of the present invention.

FIG. 3 shows another embodiment of the aquatic illumination system 300 of the present invention, in which rows of lights 320 and 321 are arranged at different depths $D_1$ and $D_2$. This could be done by the holding structures 130, 131 and traversing cables 170, 171 as shown in FIG. 1, or by using an entirely submersed structure inside rearing unit 310. The submersed structure can include traversing beam 370 and support beam 371, and these elements can also be integral parts of the tank that forms the rearing unit 310. Lights 321 can be attached directly to beam 370, or can also be suspended by a cable or pole 325, 326 from beam 370. This embodiment has advantages for the rearing of aquatic organisms that may live in different water depths, so that illumination has to be spread out over a large vertical distance. Also, such embodiment could be implemented in tanks as rearing units 310 having lights already integrated therein. In a variant, it is also possible that along single cable 326, more than one light 320 is arranged to spread out more than one light 320 along a vertical extension. Also, this embodiment shows the use of a camera 360 having a wide angle lens and preferably an image sensor with a large resolution that is connected to controller 350. Camera 360 or multiple cameras 360 can take over the function of a photometer, so that illumination condition of the rearing unit 310 can be measured based on images. Also, camera 360 and controller 350 can be programmed such that dusk and dawn times can be detected, overcast, sunshine intensity, via images that are captured by camera, and can also be used to detect local dark spots in rearing unit 310 due to local murkiness, or light failures. For smaller rearing units 310, camera 360 can be arranged centrally above the water surface of water 312 for example by installing camera 360 to a structure or a ceiling above water 312, and camera lens can be chosen having a wide angle such that the entire upper surface of rearing unit is covered by the field-of-view of camera 360. In a variant, in which rearing units 310 are large surface ponds, a unmanned aerial vehicle equipped with camera 360 could be used to fly over rearing unit 310, and to deliver aerial photos of rearing units 310 to determine defective lights, inhomogeneous lighting.

Figure 4:
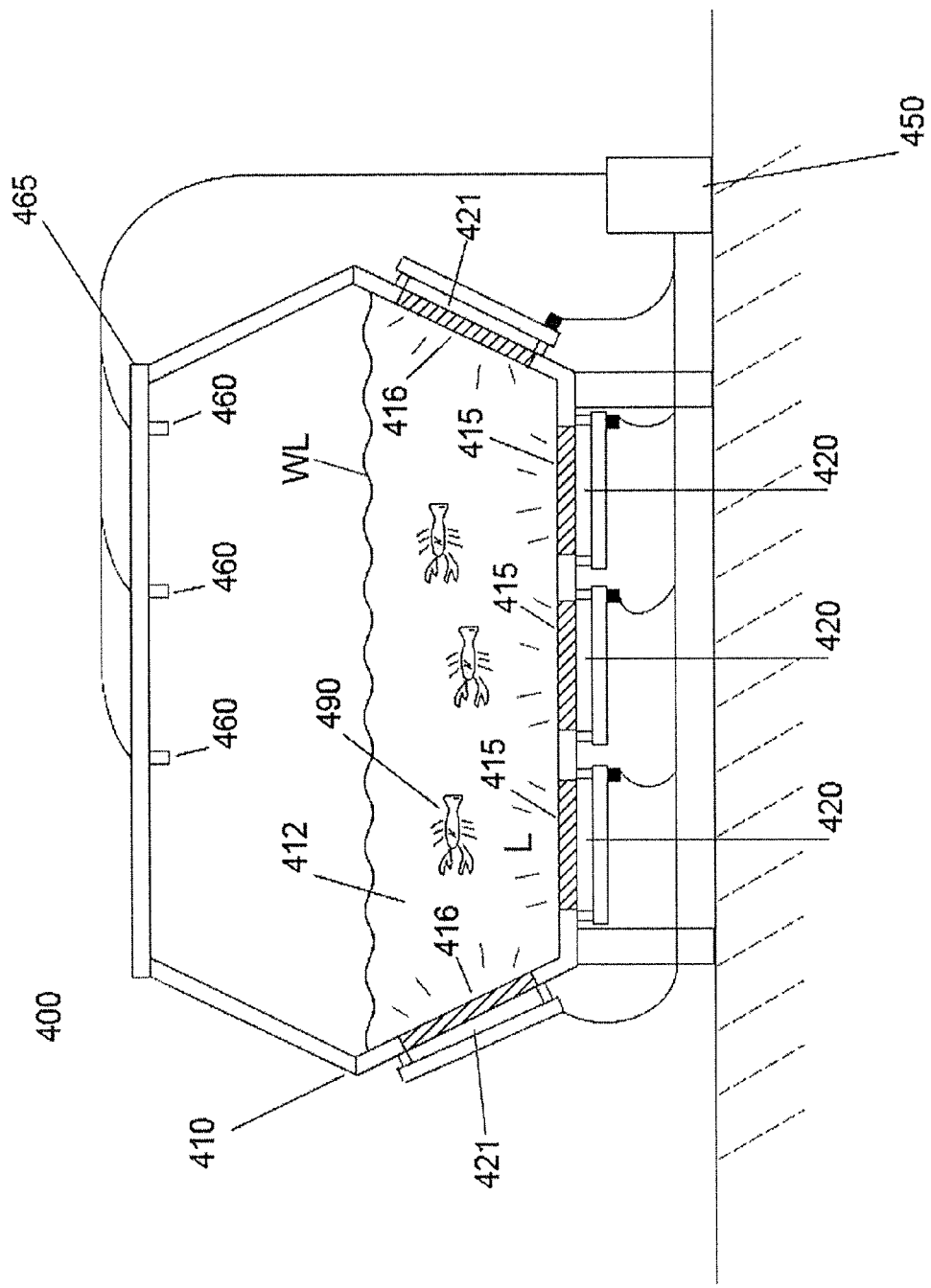
FIG. 4 shows a side cross-sectional view through a rearing unit of the aquatic illumination system according to still another embodiment of the present invention.

FIG. 4 shows another embodiment of the aquatic illumination system 400 of the present invention, in which rows of lights 420 and 421 are not actually submersed into water 412 of rearing unit 410, but are actually located outside of rearing unit 410, but illuminate light via transparent windows 415, 416, arranged in side walls and bottom walls of rearing unit 410. Because of windows 415, 416 that are entirely submersed and having its outer surface being in contact with water 412, there is no actual reflection of the light on a water-to-air interface, because windows 415, 416 serve as a medium to bring illumination light into water 412. This system 400 presents advantages for smaller man-made rearing systems 410 made of pools or tanks that need an entirely unobstructed space inside rearing unit 410, for example but not limited to frequent cleaning operation, frequent and thorough harvesting with nets that can entangle with structures inside rearing unit 410. In this system 400, aquatic organisms 490 can freely swim around in rearing unit 410. Also, lights 420, 421 can be neon tube or fluorescent lights having a longitudinal shape that are arranged parallel to each other to form large illumination surfaces. Also, system 400 includes the arrangement of a matrix or a row of light meters 460 to determine the lighting conditions from various locations, light meters 460 beam attached to a beam structure 465 above rearing unit 410. Similarly, lights 420, 421 can be flat panel lights that could be designed as window units, so that transparent windows 415, 416 and light 420, 421 would be fabricated to be in the same unit.

Figure 5:
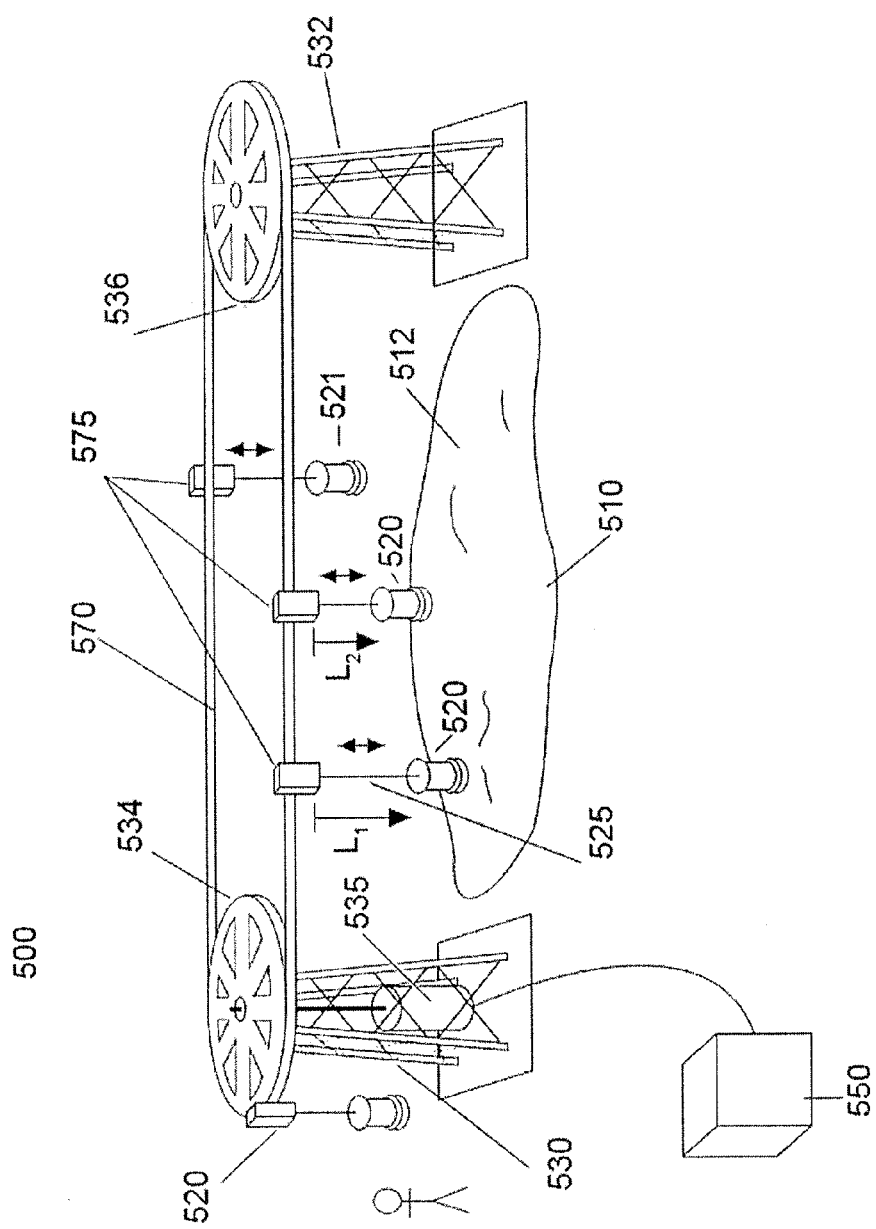
FIG. 5 shows a side-top perspective view of the aquatic illumination system according to another embodiment of the present invention.

FIG. 5 shows another embodiment of the aquatic illumination system 500 of the present invention, in which traversing cables 570, 571 are arranged as a closed loop that is wound around carrying wheels 534 and 536 and masts 530, 532, so that cables 570, 571 can be moved by rotation of wheels 534, 536, for example by electric motor 535. In addition, lights 520, 521 are suspended by cables 525 that can be rolled up and unrolled by a hoist unit 575 attached to cables 570, 571 that allows to lower and raise illumination lights 520, 521 into and out of the water, but can also be used to adjust a depth D of a location of lights 520, 521 below the surface of water 512. This can be done by unrolling cables 525 into or out of hoist unit 575 to adjust a length $L_1$ and $L_2$ to a desired value. Hoist unit 575 and motor 535 can be interconnected with controller 550 for centralized and remote control. System 500 having the adjustment of depth feature may be of particular interest in rearing units 510 that are located in the ocean and are subject to high and low tidal differences, are located in rivers having variable water levels during a harvesting season, or in waters having variable depths due to debris, deposition of mud on the ground. This arrangement allows an operator to use controller 550 to maintain a constant depth D of light despite variable water levels. For maintenance and reconfiguration purposes, illumination lights 520, 521 can be entirely pulled out of the water by hoist unit 575, and once all the illumination lights 5201 are removed from water 512, motor 535 of holding structure 530 can be turned-on to rotate wheels 534, 536 so that lights 520 and their corresponding hoist unit 575 can be moved one-by-one to a shore side of the rearing unit 510, so that maintenance such as cleaning or replacement can be performed.

Figure 6A:
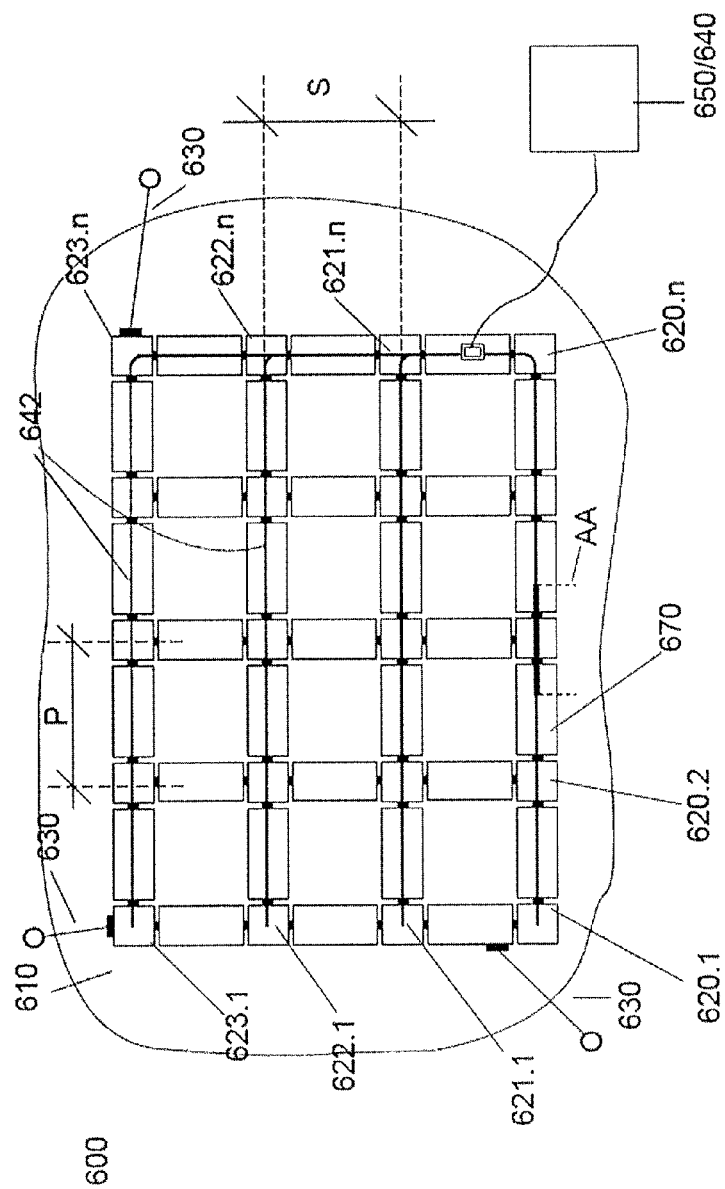
FIG. 6A shows a top perspective view of the aquatic illumination system.
Figure 6B:
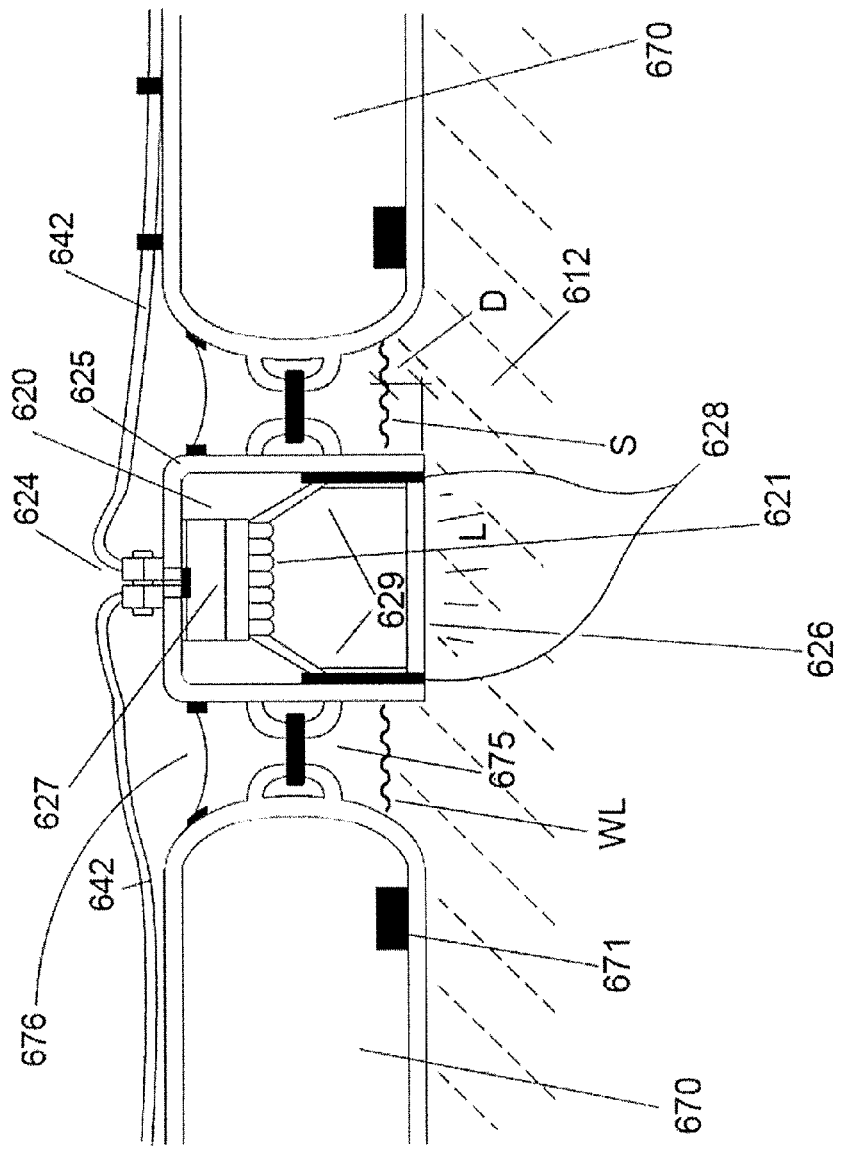
FIG. 6B shows a cross-sectional view along line AA according to another embodiment of the present invention.

FIG. 6A shows a top perspective view of the aquatic illumination system 600, and FIG. 6B shows a cross-sectional view along line AA of FIG. 6A according to another embodiment of the present invention. System 600 consists of four (4) rows of floating lighting modules 620.1 to 620.n, 621.1 to 621.n, 622.1 to 622.n, and 623.1 to 623.n at spacing S that are interconnected to each other by floatable connection elements 670, so that the entire system 600 can be placed on the surface WL of water 612 or rearing unit 610 (FIG. 6B). Anchor cords 630 can fasten system 600 to the sides or shores of rearing unit 610 or to the ground floor. While lighting modules 620.1 to 620.n, 621.1 to 621.n, 622.1 to 622.n, and 623.1 to 623.n are equipped with lamp 627, floatable connection elements 670 are merely arranged to maintain the spacing S and pitch P between lighting modules. Power distribution apparatus 640 and controller 650 can be interconnected with lighting modules via a tree of cables 642 that is attached to each floating lighting modules 620, 621, 622, 623. In a variant, cables 642 can also be arranged inside by floatable connection elements 670. As shown in the cross-sectional view of FIG. 6B, articulable joints 675 can be arranged between lighting modules and floatable connection elements 670, so that system 600 can be subject to water surface waves without generating strong mechanical stresses on system 600, and to ascertain that window 626 of lighting modules 620, 621, 622, 623 remains inside water 612.

The floatable connection elements 670 and casings of the floatable lighting modules can be made of a plastic such as polyvinylchloride (PVC) and are filled with air for floating, and they can also be equipped with weights 671 and 628 to ascertain a certain depth D of the lower surface of floatable lighting module under the water surface. Also, cables 642 can be connected from lighting module to another lighting module via waterproof connectors 624, for example by a waterproof quick connect/disconnect plugs. Lower surface of floatable lighting modules 620.1 to 620.n, 621.1 to 621.n, 622.1 to 622.n, 623.1 to 623.n can be equipped with a water-proof and sealed window 626, and lamp 627 equipped with light-emitting diodes (LED) can be arranged inside the casing. In a variant, an area between lamp 627 and lower surface of casing is filled with a light guide, and there is no empty space between lamp 627 and lower surface of casing. Lamp 627 can have reflective lamp cone 629 to guide light to water 612 of rearing unit 610. Cables 676 can be arranged in parallel to articulable joints 675 so that an angle of movement between floatable connection elements 670 and floatable lighting modules can be limited. The use of LED lights is preferred for illumination lights, in particular the use of white LEDs, due to the high light intensities that can be generated at a low power consumption, small footprint, reduced heat emissions, and the ability to use broad spectrum white LED with spectral filters or mixed color LEDs to generate illumination with a desired spectral distribution.

System 600 presents the advantage that a highly modular system can be designed for many different numbers of lighting modules 620, 621, 622, 623, lengths of floatable connection elements 670, surface area of rearing units 610, cabling, in a low-cost design that does not need heavy equipment such as the above-described holding structures for cables. Also, in this embodiment, the light sources formed by lamps 627 are actually arranged above the upper surface of water 612 and are not submersed, an interface where the light enters the water 612 is actually submersed by a distance D. Distance D can be as little as 1 cm to 20 cm, and thereby, light does not enter via an air-water interface to water 612, but via window 626. These features allow to reduce costs of the system 600, since no sophisticated water-proof casings for deeper water immersion and cabling are required. In another low-cost and simplified variant, lighting modules 620, 621, 622, 623, lengths of floatable connection elements 670 can be made by a grid of PVC tubing having a certain flexibility and not using any articulable joints 675, and all the cabling could be placed inside the PVC tubing, to further simplify the design and reduce costs.

Figure 7A:
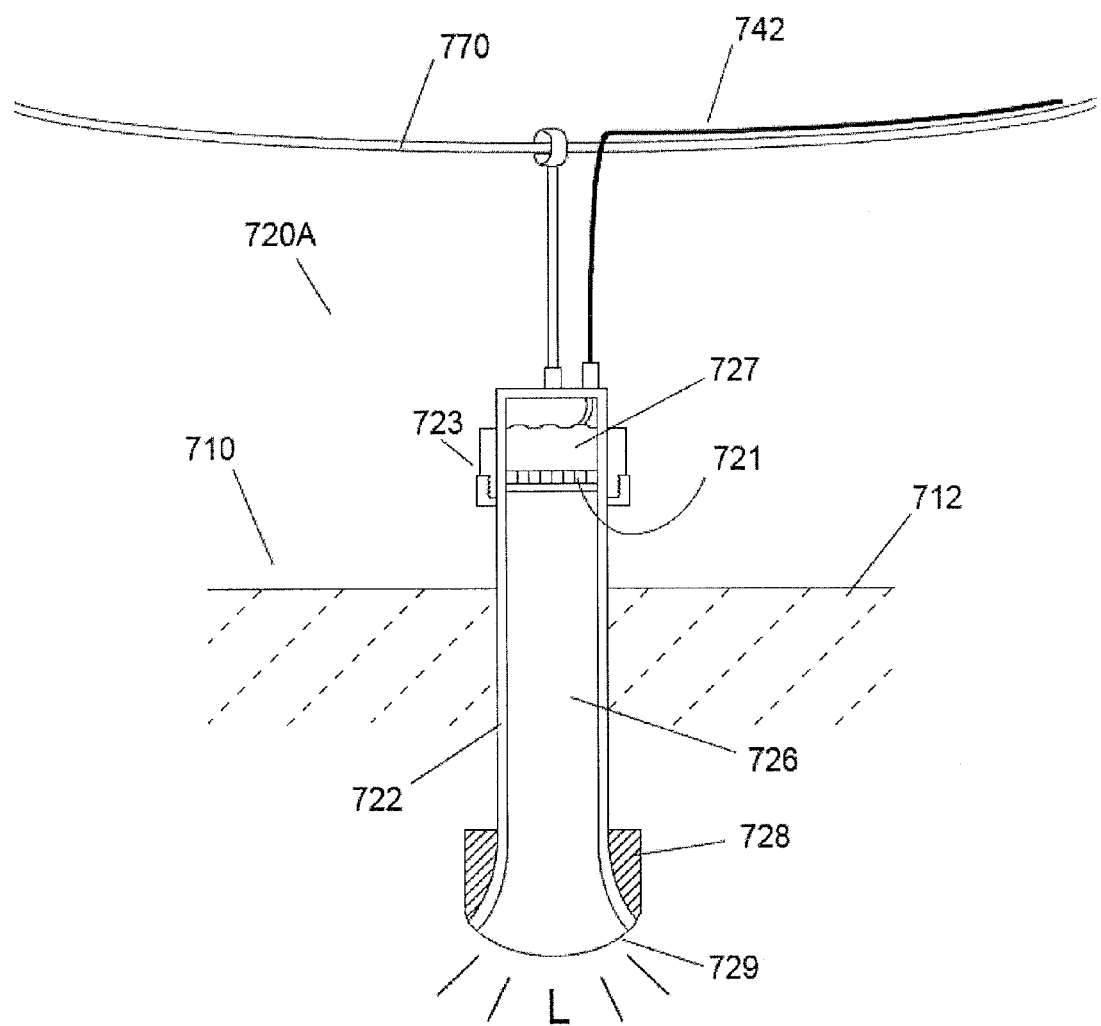
FIG. 7A shows a cross-sectional view of an illumination source.

FIG. 7A shows a cross-sectional view of an illumination source 720A that can be used for the aquatic illumination system, having a lighting module 727 that is located outside of water 712 when placed in an operative position, and having transparent light guide 726 that leads into the water 712, so that the light exiting surface 729 of light guide 726 is located underneath the water surface. Thereby, the actual light source with lighting module 727 is actually not submerged into water, but an air-to-water interface for light transition is avoided. In this variant, illumination source 720 is suspended from cable 770 that is mounted above the rearing unit 710, and cable or connection 742 can feed illumination source 720A with electrical power and control signals. An attachment mechanism 723 allows to removably attach lighting module 727 to light guide 726. Also, light guide 726 is made to be submersed into water 712 for long periods, while lighting module 727 does not have to be protected against long, durable periods of immersion in water. Also, none of the cables 742 and other electric parts have to be submersed into water 712. Therefore, short-circuits can be avoided. For lighting module, compliance with IP66 casing standards would be sufficient. This allows to make low-cost disposable light guides 726 that can be easily replaced by detaching them from the lighting module 727.

Light guide 726 can be made of a transparent material such as but not limited to Polymethyl methacrylate (PMMA), Plexiglass™, UVT acrylic, polyvynilchloride. Also, light guides 726 can be made to have specific spectral filter characteristics so that the exiting light L has a specific desired spectral distribution, in case a module is used having a broad spectrum light. This filter can be implemented by using material for light guide 726 that has desired wavelength transmission characteristics, but can also be applied as separate filter element on top or at the end of light guide 726. Also, weights 728 in the form of a ring that surrounds a lower portion of light guide can be arranged to ascertain that light exiting surface remains at a desired depth in water 712. Also, light guide 726 may be coated with a reflective coating 722 having a surface towards the light guide 726 that is reflective and bonded directly onto light guide 726, and light exit surface 729 can be coated with an algae-resistant surface coating that is transparent having durable acrylic polymer and fungistatic agents. Moreover, outer surface of coating 722 can also be configured to protect light guide 726 from being fatigued by exposure to salt water, acidity, etc. Also, in the variant shown, light exit surface 729 of light guide 726 has a spherical shape to increase the exit surface area, but could be made as being flat, substantially ball-shaped to radiate light L at a variety of different angles. In another variant, lighting module 727 is equipped with a series of LEDs that could be selectively turned on to produce specific spectral emissions and specific color of light.

Figure 7B:
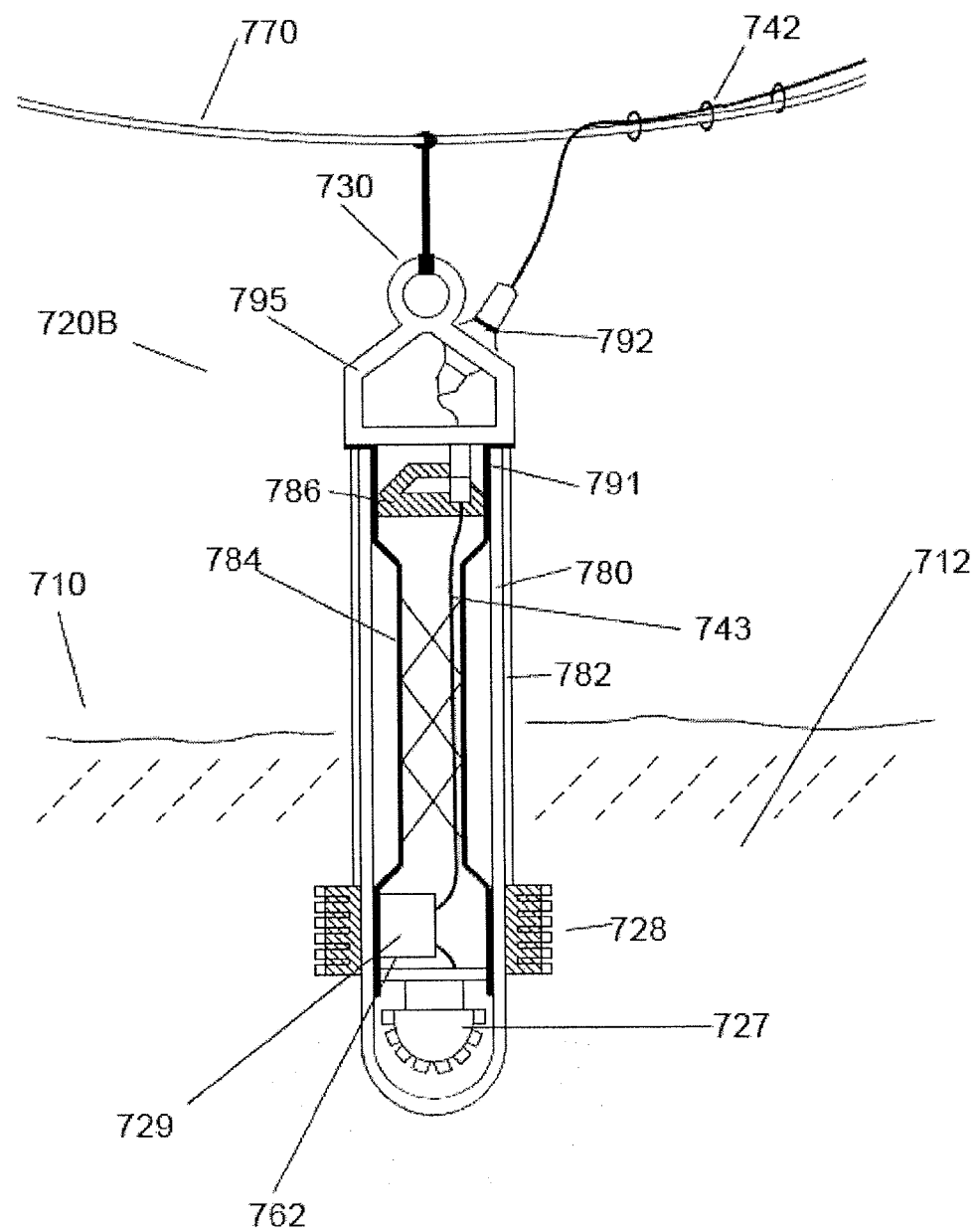
FIG. 7B shows a cross-sectional view of another illumination source according to still another aspect of the present invention.

FIG. 7B shows a cross-sectional view of another illumination source 720B that can be used for the aquatic illumination system, having a modular design, and using a cylindrical tube 780 that has a U-shaped cross section for accommodating a lighting module 727 at a lower end of cylindrical tube 780 arranged as a half-sphere. At least the lower, half-sphere portion of the cylindrical tube 780 is transparent to light emitted from lighting module 727. Lighting module 727 consist of a half-sphere of a smaller diameter that is covered with lighting elements, for example white LED lights from the company Cree™. Moreover, side walls of cylindrical tube 780 are covered with a protective tube 782 to protect outer surface of cylindrical tube 780 from environmental impacts such as corrosion, diffusions. Upper end of cylindrical tube 780 is removably connected to an enclosure cap 795 with a water and wind proof seal, and an upper part of enclosure cap 795 has an attachment ring 730 or similar attachment means that allows to attach illumination source 720B to a traversing cable 770. A water and windproof connector 792 is also arranged in enclosure cap 795 and allows to removably connect and disconnect cable 742 that can connect to a controller and power supply.

Moreover, inside of cylindrical tube 780 frame 784 is arranged, to which lighting module 727, controller 729, cable connection 743, connector 791, and frame handle 786 are attached to. When enclosure cap 792 is removed from cylindrical tube 780, connector 791 is disconnected, and then frame 784 can be pulled out of cylindrical tube 780 via handle 786. This allows to easily repair and replace different elements such as lighting module 727 and controller 729. Also, because at least a portion of cylindrical tube 780 is exposed to water, it may have aged with the exposure to salt water and can thereby easily replaced without exchanging the entire illumination source 720B. Controller 729 can be designed to control power supplied to lighting module 727, for example in a case where special light sources are used such as LED, but can also be used to be connected to sensors, for example a light meter 762 that can measure the ambient light to regulate light intensity of lighting module. Also, a combined heat sink and weight 728 is arranged to surround cylindrical tube 780, to insure that illumination source 720B remains submerged at a desired depth and to evacuate heat. Controller 729 can be bonded to frame 784 at a location adjacent to weight 728, so that weight 728 can serve to evacuate thermal waste energy from controller 729. In a variant, lighting module 727 for different types of lighting intensities, color tones, spectra, illumination angles can be designed to fit into the same cylindrical tube 780 for a modular design sharing the same components.

Figure 8:
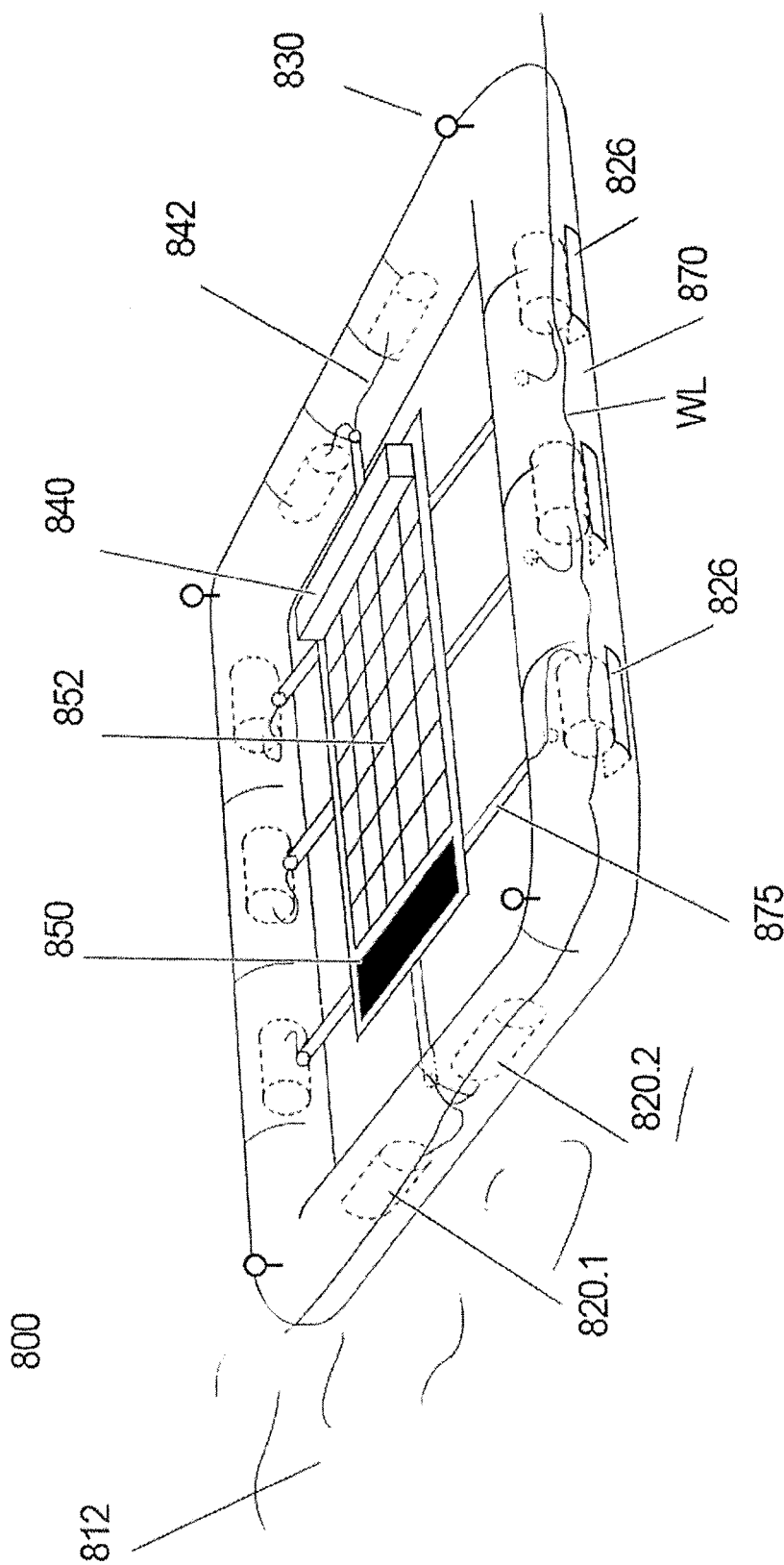
FIG. 8 shows a top perspective view of an aquatic illumination system according to still another aspect of the present invention.

Next, FIG. 8 shows a top perspective view of another aquatic illumination system 800 that uses a rectangular-shaped tube 870, with several light elements 820.1, 802.2, . . . , 820.$n$ arranged inside the tube at locations where transparent windows 826 are arranged, as another low cost variant. Also, a support beam structure 875 is arranged inside the area surrounded by rectangular-shaped tube 870 to hold a solar panel 852, a controller 850, and an electrical energy storage device 840, such as but not limited to batteries, supercaps, or fuel cells. Cable connections 842 are also arranged from energy storage device 840 to provide electrical energy to each light elements 820.1, 802.2, . . . , 820.$n$ controlled by controller 850. Windows 826 are arranged such that they are submerged in the water 812 once system 800 is placed in water 812 of rearing unit 810, so that they lie below water level WL. Moreover, attachment rings 830 or other attachment means are arranged on an upper surface of each corner of tube 870. System 800 is ideal for smaller rearing units, and can be operated energy neutral by using sunlight to power light elements 820.1, 802.2, . . . , 820.$n$ during the dark periods.

Figure 9A:
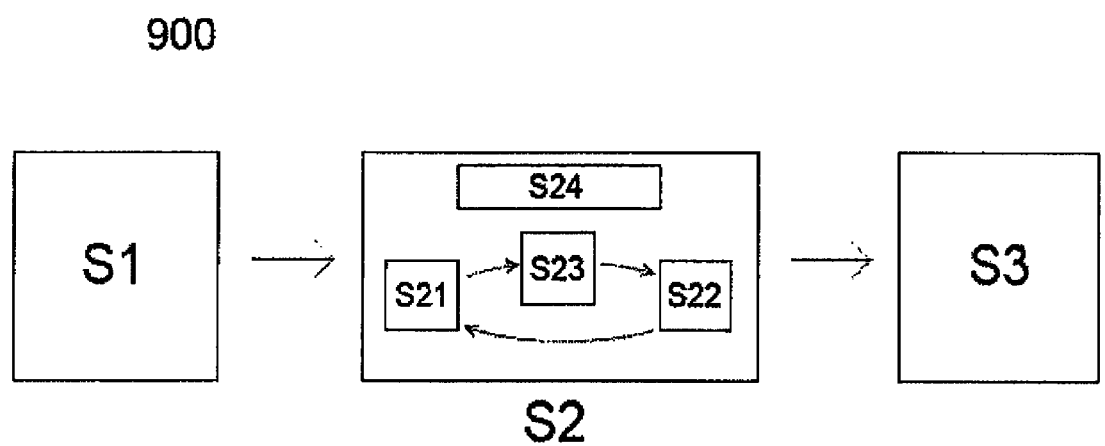
FIGS. 9A-9C show schematic representations of different methods that can be performed by the aquatic illumination system.
Figure 9B:
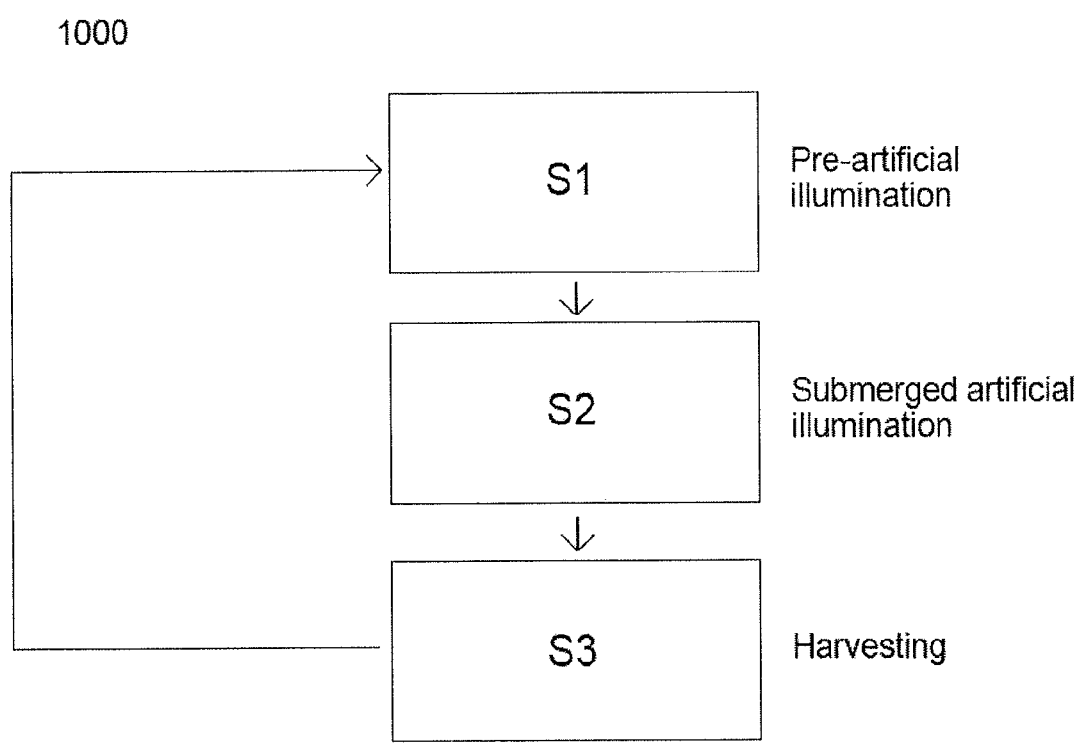
Figure 9C:
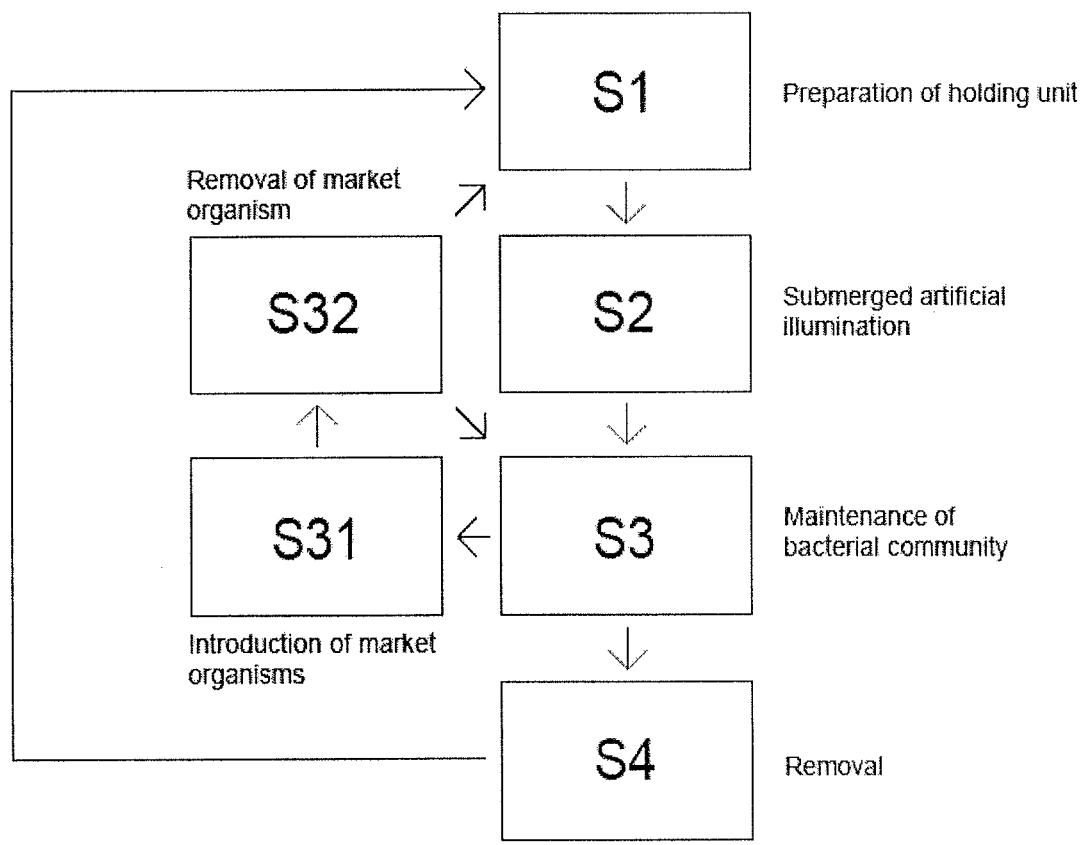

Systems 100, 200, 300, 400, 500, 600, and 800 described above with respect to FIGS. 1-6B are capable of performing different methods for enhancing growth and survivability in aquatic organism according to the present invention, as schematically shown in FIG. 9A-9C. With respect to FIG. 9A, method 900 is started with an introduction step S1 in which rearing unit 110 is prepared with water having the correct rearing characteristics, for example but not limited to temperature, oxygenation, $CO_2$, Ph-value, and a certain life stage of an aquatic organisms 190 such as shrimp are introduced into the rearing unit 110. Next, in a holding step S2, the rearing period is initiated that starts at a specific calendar start date, and is ended at a calendar end date, during which underwater artificial illumination 120, 121 in at least a defined area DA of the rearing unit 110 is performed, and during which time the photoperiod can be manipulated for 24 hours. Next, once calendar end date arrives and the rearing period ends, the submerged artificial illumination can be terminated. In a removal step S3, the aquatic organisms 190 are removed and a new rearing period can begin, and method 900 can be restarted. Method 900 allows exposure of the aquatic organisms 190 to underwater illumination 120, 121 that is different from than the ambient photoperiod.

Moreover, Step S2 is composed of different sub-steps that can be performed. During the rearing period, natural light from the sun is used, and illumination 120, 121 is turned-on in step S21 to start artificial illumination, usually at a certain time in the evening at dawn, when the natural light is insufficient to maintain a desired illumination level, in DA. This step S21 can also be triggered based on measurements, when measured light drops below a certain preset threshold value. Correspondingly, in a step S22, illumination 120, 121 is turned-off, usually at dawn when the natural light from the sun provides for sufficient illumination due to sunrise. Step S22 can also be triggered when measured light rises above the threshold value. Typically, the threshold value is set at 500 lux light measured outside rearing unit 110 by light meter 160, but can be in a range between 25 and 1000 lux. In a variant, the threshold can be set higher than 1000 lux, but would lead to increased electrical costs because it could lengthen the artificial illumination periods, and profitability of operating the system may be impacted. Step S21 and S22 can be triggered by light meter 160 and controller 150 that measures the ambient light, either outside or inside the rearing unit 110 in the water 112, or can be triggered by using a timer of controller 150 and a look-up table that provides timing values for turning on the illumination 120, 121, taking into account the different sunrise and sunset times that change during the year. In a variant, it is also possible that the steps S21 and S22 are triggered during overcast, thunderstorms, etc., to maintain artificial illumination during the day, if the measured illumination level drops below the preset threshold. As explained above, steps S21 and S22 are repeated until the rearing period comes to an end.

Step S23 is performed while the illumination is turned on, and allows to control the light intensity of illumination lights 120, 121 during the turn-on period to a desired preset value, for example by using controller 150 and power distribution apparatus 140 and measurements from photometer 160 shown in FIG. 1 to change the illumination intensity depending on water murkiness, remaining illumination from sun or moon, overcast conditions, etc. Also, step S23 can also be performed at a level of the individual lights 220, 221 with controller 250 and power distribution apparatus 240 as explained above with respect to FIG. 2. At the same time, in parallel to steps S21-S23, step S24 is performed, that includes other tasks for the performance of method 900 that are either unrelated or not correlated to the illumination, for example but not limited to measurement of water temperature, pH-value, oxygenation, current, performance of feeding cycles and protocols, water filtering and replacement, moving levels $L_1$, $L_2$, of the illumination lights 520. Also, because illumination in define areas DA of rearing units 110 is kept substantially constant during a rearing period, the feeding protocols are defined entirely independent from day or night cycles, or can be synchronized with the illumination periods. Step 25 is performed while the illumination is turned on, and allows to control the color of illumination lights 120, 121 during the turn-on period to a desired preset value, for example by using controller 150 and power distribution apparatus 140 and measurements from photometer 160 shown as an example in FIG. 1 to change the illumination color depending on operator's requirements. Also, step S25 can also be performed at a level of the individual lights 220, 221 with controller 250 and power distribution apparatus 240 as explained above with respect to FIG. 2. Step 25 is performed while the illumination is turned on, and allows control of the spectral output of the submerged illumination lights 120, 121 during the turn-on period to a desired preset value, for example by using controller 150 and power distribution apparatus 140 and measurements from photometer 160 shown in FIG. 1 to change the spectral output depending on operator's requirements. Also, step S25 can also be performed at a level of the individual lights 220, 221 with controller 250 and power distribution apparatus 240 as explained above with respect to FIG. 2.

The use of submersed illumination as described in FIGS. 1-5 or lighting that enters water without passing by an air-water interface as described in FIGS. 6A-8 is entirely novel for underwater illumination with invertebrates. For the first time, method 900 is disclosed for enhancing the production of aquatic organism, for example crawfish, by using submerged artificial illumination in rearing units. Production can be defined based on number, size and volume in weight of animals harvested, or can be also described as weight yielded per unit of surface area under culture or weight yielded per volume of water under culture. Generically, production is described as a unit measurement of desirable animals obtained. This method 900 has provided unexpected results in showing an increase in the percentage of large-sized organisms and an increase in the number of organisms surviving per unit area of the rearing unit, as compared to the background art methods. It indicates a positive affect on the physiology of the animal and its environment.

Red swamp crayfish with the scientific name "*Procambarus clarkii*" have been harvested from natural habitats, and consumed for centuries by the Native American Indians. In this application the terms 'crayfish' and 'crawfish' are used interchangeably Over the past 50 years, a crawfish farming industry has been established and developed in North America and through exports of different species expanded to Europe and Asia. Research has shown that farm production of crawfish is controlled by factors such as quantity of food, density of the animals, and levels of dissolved oxygen in their environment. Experimental tests have been performed, and aquatic organisms 190 that were exposed to varying times of illumination were harvested from the rearing units 110 during and after this photoperiod exposure. The location of the illumination lights 120, 121 may vary from on the bottom substrate to just below the water level WL or surface of water 112, but experimental results have shown that the optimal depth appears to be in a range of approximately 25 cm to 75 cm as measured from the bottom of the rearing units 110, and more preferably at about 45 cm from the bottom of the rearing units.

Systems 100, 200, 300, 400, 500, 600 and 700 described above with respect to FIGS. 1-6B are capable of performing another method 1000 for enhancing growth and survivability in aquatic organisms as schematically shown in FIG. 9B that can be specific to the use of forage crop. Method 1000 is started with a pre-artificial illumination step S1 in which rearing unit 110 is prepared with a forage crop. Once the forage crop is established, water is introduced into rearing unit 110 and a desirable water volume is established in the rearing unit 110. Upon the introduction of water to the rearing unit 110, organisms 190, which were present in the substrate of the rearing unit 110 emerge by themselves. Unlike other types of agriculture, in Red swamp crawfish pond aquaculture, organisms are not usually stocked into rearing unit 110. Next, a step S2 for submerged artificial illumination treatment is activated. S2 begins at a specific calendar start date, and is ended at a calendar end date, to form the rearing period, during which submerged underwater illumination is applied to the rearing environment under specific conditions. In method 1000 submerged artificial illumination is activated when ambient light conditions reach a threshold low as established by light meter 160 above or below the surface of water 112. When ambient lighting falls below the set threshold, submerged artificial illumination is activated. In general this threshold is met at dusk of each day. But on cloudy days or weather situations that cause reduced ambient light (i.e. heavy rainfall and overcast can drop the above water light level below 500 lux) submerged artificial illumination may be constant throughout the 24 hour clock.

Next, a harvesting step S3 begins when organisms are removed from rearing unit 110. Step S3 can extend over a period of time. Harvesting relies on a passive system where organisms enter the trap volitionally and the traps are harvested regularly and frequently over a period of time. Such harvesting does not occur in batches nor is it a one-time event. In method 1000, the timing of step S3 depends on market parameters, for example current market price and supply of organism, and relative cost of effort to remove organism, for example labor and equipment fuel costs. Submerged artificial light treatment continues during step S3 and therefore the performance of steps S2 and S3 can overlap. The end of step S3 is determined by the operator based on market conditions, for example when the price per pound of organism reaches a lower threshold level that harvesting effort is no longer cost-effective, and environmental conditions in rearing unit, for example ambient water temperatures and levels of available forage food, do not support satisfactory production levels, and size and number of animals per harvesting trap are thereby limited. The minimum acceptable size for crawfish for consumption varies with season, abundance and price. However, it has been shown that consumer preference is typically for 23 individuals ("count") per pound and larger. Large crawfish, 10-15 count per pound, usually command premium prices. When the harvesting effort ends, the submerged artificial illumination is stopped and thereby ends Step S2. Also, at the end of step S3 the water in the rearing unit is slowly removed. Remaining organisms in the rearing unit burrow into the substrate and stay below ground until flooding occurs. Method 1000 allows the organism 190 to be exposed to underwater illumination on a daily basis that is increased as compared to the ambient daily photoperiod.

Next, different examples of method 1000 as shown in FIG. 9B and a corresponding systems are discussed. In a first example, system 100 as shown in FIG. 1 was implemented using underwater halogen lights as illumination 120, 121 that were submerged in 0.1 hectare crawfish ponds, hereinafter referred to as Pond 1, located at Marco, La. on Jan. 1, 2011. Red swamp crawfish were subjected to around the clock 24-hour light exposure by combining natural illumination from the sun with the underwater artificial illumination of system 100 between dusk and dawn. The crawfish contained in Pond 1 were continually exposed to this level of illumination including 3 million candlepower (12×250,000 candlepower/light) from Jan. 1, 2011 until harvest was completed in mid-June, 2011, thereby using a rearing period of a little less than six (6) months. The rearing period is defined as encompassing a period of time involving at least one life stages in the life cycle of aquatic organisms 190, and is long enough so that a substantial amount of aquatic organisms can be grown and development can be measured. The life stages can include reproductive products, larval, juvenile, adult, and mature stage, or a combination thereof. The illumination in Pond 1 was distributed in a designed pattern of a grid of twelve (12) submerged halogen lights in a 3×4 matrix with a spacing S of about 6 feet, and a pitch P of about 5 feet in the 0.1 hectare pond. Crawfish were harvested 2-3 times per week and sized into six size categories using a Vidal Thibodeaux Industries automatic belt-grader. As shown in FIG. 1, lights 120, 121 hung directly perpendicularly down from the support cables 170, 171. Distance from ponds edge and between lights was approximately 20 feet.

The harvest from Pond 1 was compared with the harvest from another pond, Pond 2, as a reference. Pond 2 has the same surface dimensions of Pond 1 with 0.1 hectare of water surface at a depth of 36 inches. There were no lights in Pond 2, so Pond 2 was only illuminated by natural illumination from the sun. Similar to Pond 1, the perimeter of Pond 2 was surrounded by a 4 foot high metal mesh predator fence with gated access at one corner. Table I shows the harvesting results from Pond 1 that was illuminated with lights 120, 121, in addition to sunlight, as compared to Pond 2 having only natural light. Grade 1: mean weight of 0.00404 grams (114 crawfish to the pound), Grade 2: mean weight of 0.00958 grams (47 crawfish to the pound), Grade 3: mean weight of 0.01253 grams (36 crawfish to the pound), Grade 4: mean weight of 0.02093 grams (22 crawfish to the pound), Grade 5: mean weight of 0.03634 grams (13 crawfish to the pound), and Grade 6: mean weight of 0.0493 grams (9 crawfish to the pound). Crawfish are marketed by weight and size. The minimum acceptable size for crawfish for consumption varies with season, abundance and price; however, consumer preference is typically for 23 individuals ("count") per pound and larger. Large crawfish (10-15 per pound or "count") usually command premium prices. In our example, crawfish that fell into Grades 4, 5 and 6 are usually consumer preferred and are classified as "Selects." Crawfish in the Grade 3 size category are sellable but not at a preferred price. Production (weight) of crawfish is then considered in two categories—"Field run", which includes Grade sizes 3 through 6 and "Selects" which only includes crawfish size Grades of 4, 5 and 6.

TABLE I

| | Total Harvest Weight (kg) | | | | | |
|---|---|---|---|---|---|---|
| | Grade 1 | Grade 2 | Grade 3 | Grade 4 | Grade 5 | Grade 6 | Total |
| Pond 1 | 0.05 | 13.421 | 89.25 | 40.39 | 6.276 | 2.119 | 151.516 |
| Pond 2 | 0.174 | 11.684 | 53.471 | 8.929 | 1.259 | 1.168 | 76.785 |

It can be seen that Pond 1 has produced close to twice the weight of crayfish as compared to Pond 2 that was only subject to sunlight illumination. The difference of production is particularly important for Grades 4-5, in which the production weight has increased by a factor 4.52 (Grade 4) and a factor (4.98), these being grades of crayfish having high commercial value. Also, the above discussed background art reference Wang et al. obtained results that were substantially inferior to the results of Pond 1, in which above-water surface illumination for shrimp rearing did not produce strong production increases at all. In Wang et al. it was shown that the specific growth rate (SGRd) of juvenile "*Fenneropenaeus Chinensis*" shrimp over a 35 day period under different light intensities for intense above-water light illumination was merely in a range of 21.1% to 29.4% as compared to natural light illumination. Also, Wang et al. concluded that shrimp may grow better in organically rich earthen ponds that have lower light intensities. Therefore, the production results of the present invention are strongly unexpected in light of the relevant background art, and have led to the above discussed superior results.

Next, some details of the experimental system, set-up and methods are discussed and the results presented, to analyze the impact of different types of lighting and arrangements. Research on submerged artificial illumination in crawfish ponds was conducted in the years 2008-2012 at the Aquaculture Research Center at Northwestern State University, located in Natchitoches Parish, La., U.S. Artificial ponds as rearing units 110, 210, etc. were used for the crawfish involving submerged artificial illumination. The following describes the light configuration in the studies conducted in 2008-2009 growing season. These studies involved (6) square, earthen ponds. Each pond has a water surface area of 0.1 hectares. There were three (3) ponds with perimeter fencing and aerial lines transecting the surface area of the ponds, hereinafter "Control," three (3) ponds with twelve (12) underwater halogen lights per pond, arranged in a 4 by 3 matrix, perimeter fencing and aerial lines, hereinafter "3×4 Matrix of Halogen Lights."

In August 2008, all ponds were planted with Sudan/Sorghum grass at 30 lbs to the acre and fertilized with 13 Nitrogen-13 Phosphous-13 Potash. Ponds were flooded in autumn 2008 with freshwater to a maximum water depth of 1 m. All ponds had predator exclusion fencing 4 foot high, 3 inch square metal mesh with gated access at one corner. Steel wire with waterproof electrical wire attached was strung across the pond surface at a spacing S=2 m to form the traversing cables 170, 171 and power wiring 140, 142, creating an aerial grid at a height H of 6 meters above the pond surface. The three ponds designed as 3×4 Matrix of Halogen Lights were equipped with underwater lighting having twelve 12 underwater lights arranged in a 3 by 4 matrix having a pitch P of 3.5 m. In this test, the lights used were Brinkman Q-Beam Starfire 11, hung from the traversing cables. Each Brinkman Q-Beam Starfire 11 emits 250,000 footcandles of light intensity. Lights were turned on by a photoelectric sensor at dusk and turned off at dawn. Lights were also automatically turned on by the photoelectric sensor on cloudy days when ambient light was insufficient to meet the threshold off setting. The lights were approximated 30.5 cm below water surface level WL. The light treatment began in January 2009, and continued until the study ended in June 2009.

Regarding the harvesting, crawfish were harvested using pyramid traps constructed with hexagonal wire mesh with a mesh size of 1.9 cm form Gulf coast Wire Products, Kaplan, La., U.S. and placed at a density of 120/ha. The traps had three funnel entryways having a 3.8 cm inner diameter, elongated necks having a length of 60 cm that extended above the water surface, and polyvinyl chloride retaining rings being 9 cm tall at the top. Traps were baited with approximately 100 g of artificial bait with Purina Jumbo Crawfish Bait, from Purina Mills. Rebaiting of traps occurred after each trap was harvested.

Crawfish were harvested from February to April on Mondays and Thursdays. In April, harvesting effort was increased to three times per week, Monday, Wednesday and Friday. A mechanical fish grader from Vidal Thibodeaux Industries, New Brunswick, Canada was used to grade into six size categories the capture from each pond for each harvest day. The grades were established based on the classification discussed above. Moreover, the quality of the water of the ponds was monitored. Dissolved oxygen, temperature and Ph-values of the pond water were continuously monitored via sensors and recorded at two hour intervals using Hydrolab DSSX Water Quality MiniSondes from the manufacturer Hach Laboratories, as sensors 160 from six (6) ponds. There was no supplemental aeration of the ponds and no water exchange after the first flooding in autumn 2008.

Different combination of submerged lighting was used to provide artificial illumination in each of the four study years with production results compared against a control treatment, to compare the effects of the different lighting. The following Tables II-V present the results of four different study years, with Table II representing the harvest data of the experiments that were performed in 2009 with Sudan/Sorghum forage using a light treatment of 3×4 Matrix of Halogen lights Table III representing the harvest data of the experiments in 2010 with Sudan/Sorghum forage and 3 different light treatments 1) 3×4 Matrix of Halogen lights, 2) 3×2 Matrix of Halogen lights and 3) 1×2 Matrix of Fluorescent lights. Table IV representing the harvest data of the experiments in 2011 with Rice forage, and three (3) different light treatments 1) 3×4 Matrix of Halogen lights, 2) 2×3 Matrix of Halogen lights and 3) 1×2 Matrix of Fluorescent lights and Table V representing the harvest data of the experiments in 2012 with Sudan/Sorghum forage and 3 different light treatments 1) 3×4 Matrix of Halogen lights 2) 2×3 Matrix of Halogen Lights and 3) 3×4 Matrix of LED Lights.

TABLE II

| Treatment | Total pounds | Average pounds per acre |
|---|---|---|
| 3 × 4 Matrix of Halogen lights | 268.34 | 1073.37 |
| Control | 179.39 | 717.58 |

TABLE III

| Treatment | Total pounds | Average pounds per acre |
|---|---|---|
| 3 × 4 Matrix of Halogen lights | 200.21 | 800.83 |
| 2 × 3 Matrix of Halogen lights | 214.92 | 859.70 |
| 1 × 2 Matrix of Fluorescent lights | 222.58 | 890.31 |
| Control | 235.42 | 941.66 |

TABLE IV

| Treatment | Total pounds | Average pounds per acre |
|---|---|---|
| 3 × 4 Matrix of Halogen lights | 429.89 | 1719.58 |
| 2 × 3 Matrix of Halogen lights | 220.66 | 882.63 |
| 1 × 2 Matrix of Fluorescent lights | 176.00 | 703.99 |
| Control | 217.21 | 868.84 |

TABLE V

| Treatment | Total pounds | Average pounds per acre |
|---|---|---|
| 3 × 4 Halogen Light Matrix | 78.36 | 313.46 |
| 2 × 3 Halogen Light Matrix | 112.24 | 448.98 |
| 3 × 4 LED Light Matrix | 118.47 | 473.88 |
| Control | 96.07 | 384.30 |

Next, Tables VI-VII represent the mean production in pounds per acre, for entire years. When marketing crawfish, there were two categories of packaged crawfish available for purchase based on the size range of crawfish included in the package: "Field run" or "Selects." Packages containing "Field run" had crawfish from Grades 3 to Grade 6 mixed together. Packages containing "Selects" had only Grades 4 to Grade 6 mixed together. "Select" crawfish are more desirable and can command a hirer price in the market place. The results for the production of "Select" crawfish is presented in Table VII.

TABLE VI

| | Mean pounds per acre production, all sizes | | |
|---|---|---|---|
| Treatment | 2009 | 2010 | 2011 |
| 1 × 2 Matrix of Fluorescent lights | | 890.31 | 703.98 |
| 2 × 3 Matrix of Halogen lights | | 859.70 | 882.63 |
| 3 × 4 Matrix of Halogen lights | 1073.37 | 800.83 | 1719.58 |
| Controls | 717.58 | 941.66 | 868.84 |

TABLE VII

| | Mean pounds per acre production, "Selects" size | | |
|---|---|---|---|
| Treatment | 2009 | 2010 | 2011 |
| 1 × 2 Matrix of Fluorescent lights | | 577.23 | 771.19 |
| 2 × 3 Matrix of Halogen lights | | 580.57 | 597.75 |
| 3 × 4 Matrix of Halogen lights | 229.43 | 470.89 | 1151.98 |
| Controls | 62.45 | 407.05 | 710.49 |

Figure 10A:
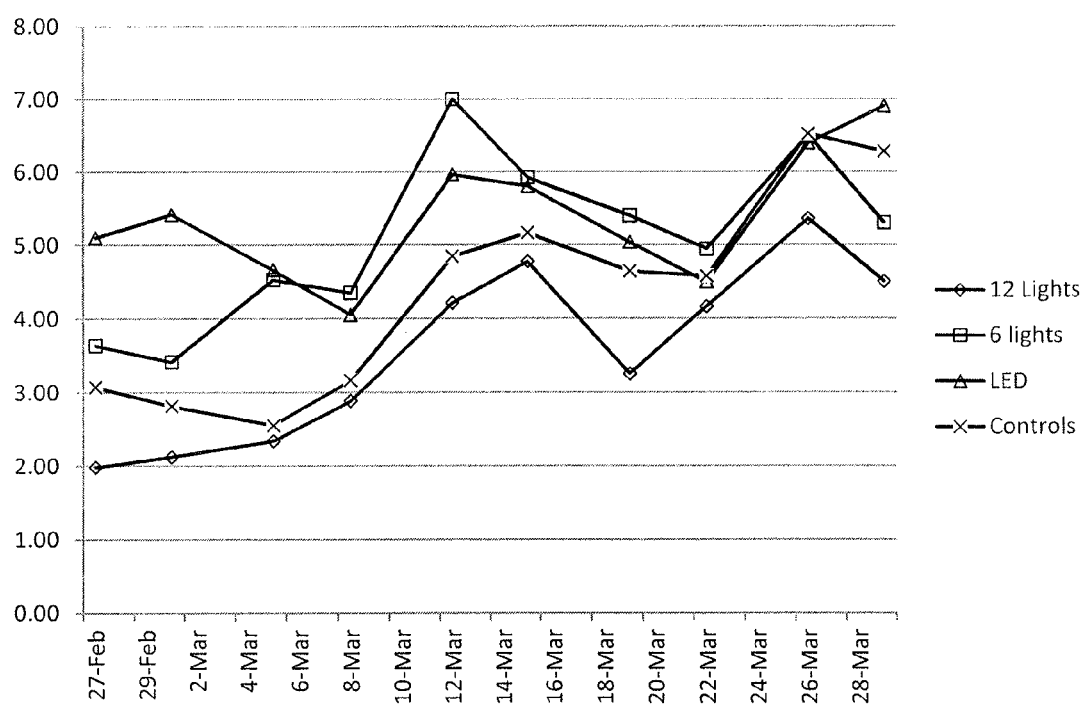
FIGS. 10A-10D shows various graphs that represent harvest production in kilos as a function of time.
Figure 10B:
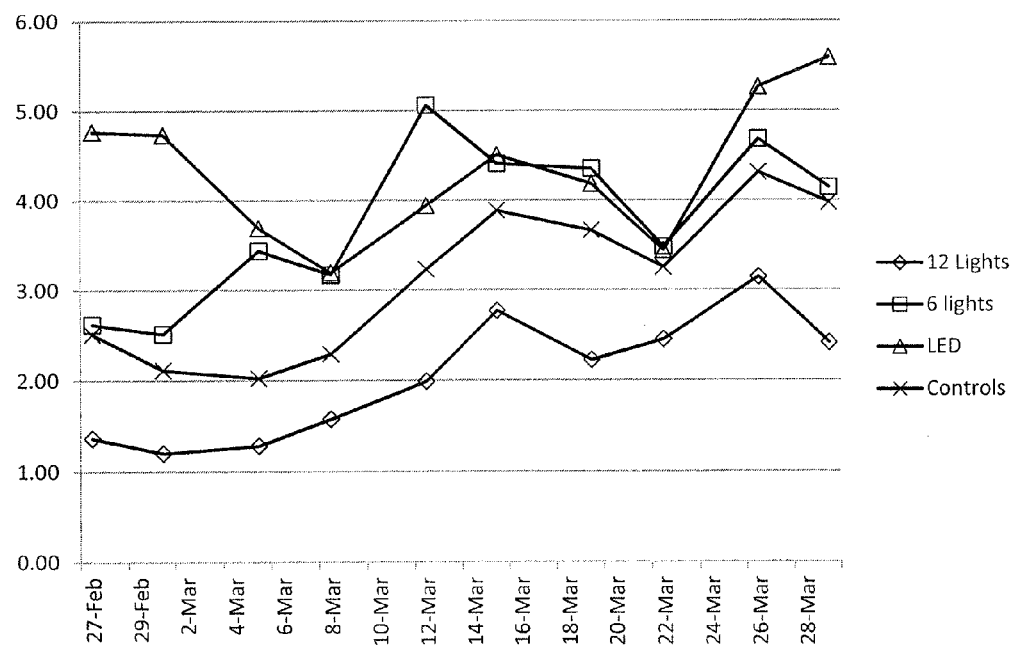
Figure 10C:
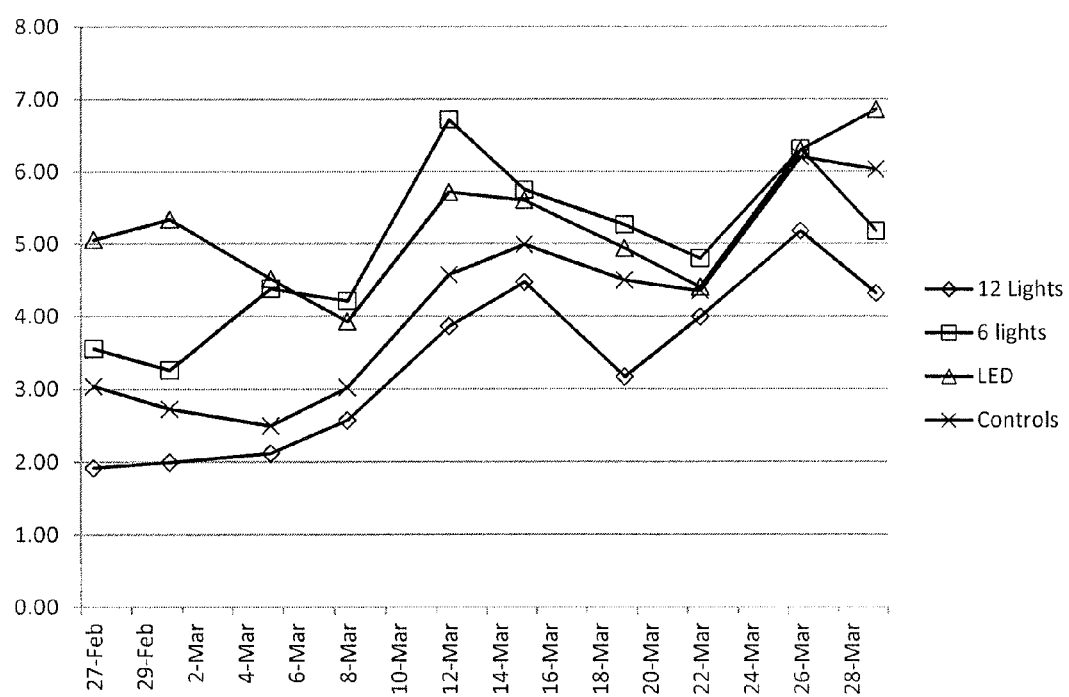
Figure 10D:
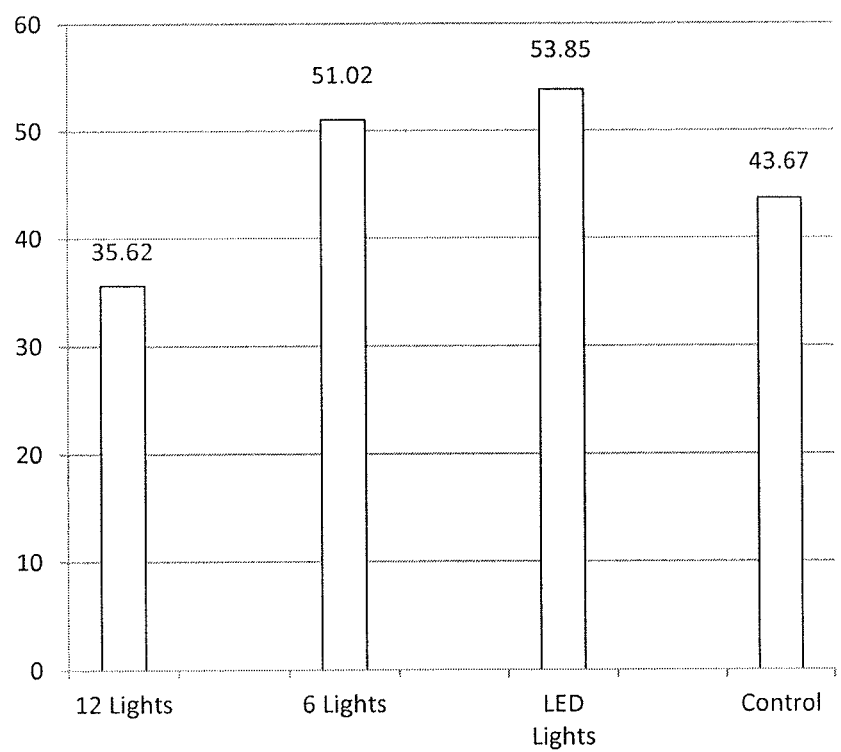

Moreover, detailed data on the different ponds with different lights and control are also represented in FIGS. 10A-10D, in which FIG. 10A is representing a comparison of the total production in kg of crawfish over time for various light treatments in the year 2012, FIG. 10B is representing a comparison of the production in kg of "Select" classified crawfish over time for various light treatments in the year 2012, FIG. 10C is representing a comparison of the production in kg of "Field Run" classified crawfish over time for various light treatments in the year 2012, and FIG. 10D is representing six (6) weeks of cumulative harvest in 2012 depending of different light treatment in (kg). In 2012 submerged LED illumination as an light illumination source was used for the first time.

It appears that the white LED light shows the best production results over the tested time periods. The LED lights showed the most consistently high production over time in both the "Select" size category (FIG. 10B) and in the "Field run" size category (FIG. 10C). Overall, the ponds with the submersed LED illumination showed a 23% higher production than the controls (FIG. 10D). The 3×4 Matrix of LED lights provided the greatest intensity of light to the rearing units providing illumination greater than 1 million units of candlepower. However, the superior performance resulting from the use of white LED lights also may be related to their spectral output, generating very broad spectrum of light. Research on spectral sensitivity of adult crayfish has shown that ranges from 560 nm to 640 nm for illumination as the maximum wavelength of visual pigment and spectral sensitivity. However, it is also known that there is a seasonal change and perhaps an environmental adaption to visual perception in crayfish. See Publication entitled "Spectral Sensitivity in Crustacean Eyes," T. W. Cronin and H. Hariyama, The Crustacean Nervous System, Konrad Weise (Ed.), pages 499-511, Springer Verlag Berlin, Heidelberg, 2002, this publication herewith being incorporated in its entirety by reference. Other publications have shown that crustacean threshold reception of light can be as low as 300 nm and as high as 660 nm depending on environmental conditions and species, see publication entitled "Comparative Studies of Crustacean Spectral Sensitivity," T. H. Goldsmith and H. R. Fernandez, Zeitschrift fur vergleichende Physiologie 60, pages 156-175, 1968, this publication herewith being incorporated in its entirety by reference.

Also, systems 100, 200, 300, 400, 500, 600 and 700 described above with respect to FIGS. 1-6B are also capable of performing another method 1100 for enhancing growth and survivability in aquatic organisms as schematically shown in FIG. 9C. Method 1100 can have one or more species of aquatic organism targeted for enhanced production and survivability within the rearing unit. Method 1100 begins with step of preparing the rearing unit S1 in which rearing unit 110 is prepared with organic matter, nitrogen fertilizer, water levels and specific water quality parameters are established, inoculums initiated, and water aeration employed. Next, a step of submersing the artificial illumination step S2 is started in which the artificial light treatment is activated. The daily use of submerged artificial illumination is variable depending on the requirements of the bacterial community within the rearing unit. Illumination may occur at very limited times during the day or may be on during the day and throughout the natural night time. Characteristics of the illumination may differ in light intensity, color, spectrum, and location during the daily photoperiod.

In a step of maintaining the bacterial community S3, the rearing period is continued with variations in characteristics of submerged artificial light being employed in concert with other water quality and organism requirements to sustain a healthy bacterial community in rearing unit 110. Adjustments in inputs to rearing unit 110, for example but not limited to water, organic material, chemicals, inoculates, natural and artificial lighting above the water as well as submerged artificial illumination, continue. Next, in a removal step S4 the bacterial community is removed, and a new rearing period can begin, and method 1100 can be restarted at step S1. Step S3 can be composed of different sub-steps. For example, during the maintenance of the bacterial community in the rearing unit, a step of introducing the market organisms S31 can be initiated. Step S31 begins when one or more species of organisms to be reared for market is introduced into the rearing unit. Feeding of the organisms commences. Next, a removal step S32 begins with the removal of some or all of the market organisms from the rearing unit. Step S32 is complete when all of the organisms are removed from the rearing unit. Differential use of submerged artificial illumination continues during the S31 and S32 period not only in support of the bacterial community production but also the illumination needs of the market organisms. At the end of step S32, a new rearing period can begin, and method 1100 can be restarted at S1 or at S31 when new market organisms are introduced into rearing unit 110, with step S31.

While the invention has been disclosed with reference to certain preferred embodiments describing systems, methods and illumination devices, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

The invention claimed is:

1. A method for enhancing the production of aquatic organisms under cultivation, including the steps of:
exposing the aquatic organisms under cultivation to light from illumination means within water of an aquatic rearing means, the illumination means forming a light pattern spread out inside the water of the aquatic rearing means; and
maintaining the light from the illumination means in the aquatic rearing means for a rearing period to increase growth of the aquatic organisms in the aquatic rearing means.

2. The method according to claim 1, wherein the illumination means includes a light guide that guides light from an illumination source located outside the water of the aquatic rearing means into the water of the aquatic rearing means.

3. The method according to claim 1, wherein the aquatic organism include crayfish.

4. The method according to claim 1, wherein a light emitting surface that introduces the light into the aquatic rearing means of the illumination means is located between a bottom of the aquatic rearing means and 1 mm below an upper surface of the water of the aquatic rearing means.

5. The method according to claim 1, wherein a light emitting surface that introduces the light into the aquatic rearing means of the illumination means is located 10 cm above a bottom of the aquatic rearing means and 1 cm below an upper surface of the water of the aquatic rearing means.

6. The method according to claim 1, wherein the aquatic organisms include crayfish, and a spectral light range of the light from the illumination means covers at least a range of 300 nm to 640 nm.

7. The method according to claim 1, further comprising the step of:
harvesting the aquatic organisms from the aquatic rearing means that have grown to a marketable size.

8. A method for affecting the growth of aquatic organisms comprising the steps of:
exposing the aquatic organisms under cultivation to light from illumination means within water of an aquatic rearing means, the illumination means forming a light pattern spread out inside the water of the aquatic rearing means; and
maintaining illumination in the aquatic rearing means by the illumination means for at least a part of a rearing period to increase growth of the aquatic organisms in the aquatic rearing means.

9. The method according to claim 8, wherein the illumination means includes a light guide that guides light from an illumination source located outside the water of the aquatic rearing means into the water of the aquatic rearing means.

10. The method according to claim 8, wherein the aquatic organism include crayfish.

11. The method according to claim 8, wherein a light emitting surface of the illumination means is located between a bottom of the aquatic rearing means and 2 cm beneath an upper surface of the water of the aquatic rearing means.

12. The method according to claim 8, wherein the aquatic organisms include crayfish, and a spectral light range of the light from the illumination means covers at least a range of 300 nm to 640 nm.

13. The method according to claim 8, further comprising the step of:

harvesting the aquatic organisms that have grown in the aquatic rearing means to a marketable size.

14. A system for enhancing the production of aquatic organisms under cultivation, the system comprising:
- an aquatic rearing means for holding water and the aquatic organisms under cultivation;
- an illumination means for providing light within the water of the aquatic rearing means, the illumination means having a light emission surface introducing the light into the water arranged below an upper surface of the water of the aquatic rearing means, the illumination means forming a light pattern spread out in the aquatic rearing means; and
- a control device for operating the illumination means to maintain the light inside the aquatic rearing means for a rearing period to increase growth of the aquatic organisms inside the aquatic rearing means.

15. The system according to claim 14, further comprising:
- a power supply device connected to the illumination means,
- wherein the control device further controls the power supply device to operate the illumination means.

16. The system according to claim 14, wherein the illumination means includes a light guide that guides light from an illumination source located outside the water of the aquatic rearing means into the water of the aquatic rearing means.

17. The system according to claim 14, wherein the aquatic organisms include crayfish, and a spectral light range of the light from the illumination means covers at least a range of 300 nm to 640 nm.

* * * * *